US007010546B1

(12) United States Patent
Kolawa et al.

(10) Patent No.: US 7,010,546 B1
(45) Date of Patent: Mar. 7, 2006

(54) METHOD AND SYSTEM FOR TESTING DATA SOURCES AND DATABASE ORIENTED SOFTWARE APPLICATIONS

(75) Inventors: Adam K. Kolawa, Bradbury, CA (US); Arthur R. Hicken, Upland, CA (US); Wendell T. Hicken, La Verne, CA (US); Marek Kucharksi, Crakow (PL)

(73) Assignee: Parasoft Corporation, Monrovia, CA (US)

( * ) Notice: Subject to any disclaimer, the term of this patent is extended or adjusted under 35 U.S.C. 154(b) by 238 days.

(21) Appl. No.: 10/624,978

(22) Filed: Jul. 22, 2003

Related U.S. Application Data

(63) Continuation-in-part of application No. 09/666,682, filed on Sep. 20, 2000, now abandoned.

(60) Provisional application No. 60/433,467, filed on Dec. 13, 2002.

(51) Int. Cl.
G06F 17/50 (2006.01)

(52) U.S. Cl. .................................................. 707/103 R
(58) Field of Classification Search .............. 707/1–10, 707/100–104.1; 709/202; 370/252; 379/211.02
See application file for complete search history.

(56) References Cited

U.S. PATENT DOCUMENTS

| | | | |
|---|---|---|---|
| 5,537,467 A * | 7/1996 | Cheng et al. | 379/211.02 |
| 5,710,900 A | 1/1998 | Anand et al. | |
| 5,761,650 A | 6/1998 | Munsil et al. | |
| 5,832,504 A | 11/1998 | Tripathi et al. | |
| 6,473,407 B1 * | 10/2002 | Ditmer et al. | 370/252 |
| 2002/0002580 A1 * | 1/2002 | Nurick | 709/202 |

OTHER PUBLICATIONS

Halberg, Kinkoph, Ray, et al.; Special Edition Using Excel 97 Bestseller Edition; 1997; Que Corporation; pp. 86, 125, 137, 158, 168-169, 384, 417-420, 550, 610, 647-650, 654, 853-857, 863.
Microsoft Computer Dictionary, fifth edition, p. 141.
Surajit Chaudhuri, Umeshwar Dayal; An overview of data warehousing and OLAP technology; ACM SIGMOD Record, Mar. 1997, vol. 26, Issue 1.

* cited by examiner

Primary Examiner—Diane D. Mizrahi
(74) Attorney, Agent, or Firm—Christie, Parker & Hale, LLP

(57) ABSTRACT

In one embodiment, the present invention is a method and system for testing databases and database oriented applications through analyzing database contents and structure. The method and system provide a framework for various tests, which can be deployed against the database structure or contents. The system provides a set of ready to use tests, however, custom tests can also be written using system API. Tests used within the framework constitute test suites. Test suites can be used during database oriented application development process for regression testing, verifying newly added functionality, re-testing of existing and modified functionality, deploying new versions of an application. Test suites can also be used for database monitoring and database cleaning.

25 Claims, 22 Drawing Sheets

| Button | Name | Action |
|---|---|---|
|  | Report | Opens the Report panel, which allows you to compose reports which can be added to report templates. |
|  | Visual Editor | Opens the Visual Editor, which allows you to create report templates that are used to produce your desired dynamic or static report. |
|  | SQL Panel | Opens the SQL panel, which lets you view and modify records in your data source. |
|  | Easy DR | Opens a panel which allows you to access a DataRecon Report Creation wizard and tutorial. |

FIG. 2A

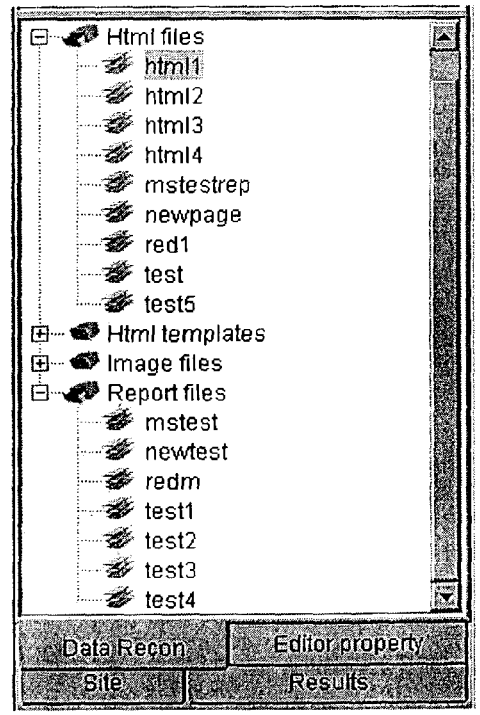

| Button | Name | Action |
|---|---|---|
| | New | Creates a new report |
| | Save | Saves the current report as a report file |
| | Stop | Stops the current Report Editor process |
| | Refresh | Refreshes the report |
| | Settings | Lets you change Report panel settings |
| | Preview | Displays your report in your default web browser |

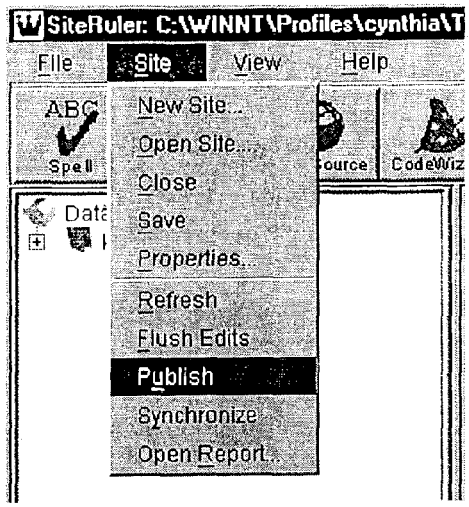
FIG. 11E
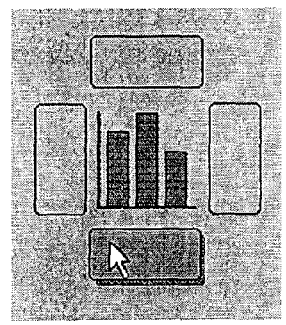
FIG. 12
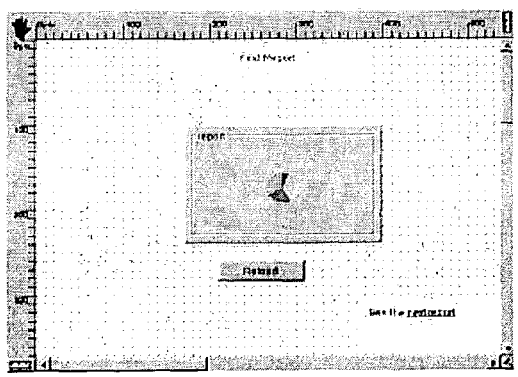 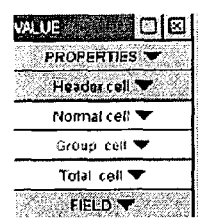
FIG. 13A FIG. 13B

METHOD AND SYSTEM FOR TESTING DATA SOURCES AND DATABASE ORIENTED SOFTWARE APPLICATIONS

CROSS-REFERENCE TO RELATED APPLICATION(S)

This patent application is a Continuation-in-Part (CIP) of the U.S. patent application Ser. No. 09/666,682, filed Sep. 20, 2000 now abandoned and entitled "METHOD AND SYSTEM FOR EASILY ACCESSING DIFFERENT DATA SOURCES", the entire contents of which are hereby expressly incorporated by reference. This patent application also claims the benefit of the filing date of U.S. Provisional Patent Application Ser. No. 60/433,467, filed Dec. 13, 2002 and entitled "METHOD AND SYSTEM FOR TESTING DATA SOURCES," the entire content of which is hereby expressly incorporated by reference.

FIELD OF THE INVENTION

The present invention relates to a computer system and method for TESTING different data sources and database oriented software applications.

BACKGROUND OF THE INVENTION

As the web sites become increasingly popular, they get exceedingly more complex and contain more data using various data sources. Sophisticated file hierarchies, abundant information contents, and numerous links to other sites and databases are among the common features that are used in the design of new web sites. Many of these web sites have to retrieve data from other web sites and a variety of different data sources with different interfaces. As a result, connecting to different data sources and allowing transfer of data between them have become tedious and time-consuming tasks that generally require software expertise to accomplish. For example, a person who wants to generate a report that requires data from different data sources has to know and understand every data source containing the requested data and has to have knowledge of HTML and/or Structured Query Language (SQL) programming languages to be able to interface with these data sources.

Furthermore, a large number of modern computer software applications, especially those built for business purposes take advantage of relational database to store persistent data. In a process of developing computer applications, one of the major issues is assuring an appropriate level of quality. Mission critical applications require thorough testing prior to deployment. Applications entailing less reliability requirements can be built and deployed with less thorough testing. However, this approach causes more defects to remain undetected until an end user of the application software discovers them. In a typical situation, the end user informs the software vendor of the discovered defective. Then, the software vendor, after some additional verification, provides patches to fix the software defect. However, in database oriented applications software defects discovered by end users may cause serious side effects and fixing the defects may be several times more costly then fixing the software prior to deployment. Incorrect records of business events in a database affect reporting for tax purposes, business decisions, etc. More importantly, subtle defects which affect only database records may stay hidden for a long time. In this situation, repairing the database records is costly, time and resource consuming, and may sometimes be even impossible.

SUMMARY OF THE INVENTION

In one embodiment the present invention is a system and method for testing a database oriented software application that interacts with a database. The system and method includes an editor module for creating Structured Query Language (SQL) queries; a data repository for storing database structures and SQL queries; a rule creator module for creating patterns of relational structure to be detected in the database; a database analyzer module for building test suites and executing the test suits using a plurality of tests; and a monitor module for monitoring the interaction of the software application with the database. The monitor module further comprises means for profiling the software application and means for extracting SQL queries for building test suits.

BRIEF DESCRIPTION OF THE DRAWINGS

These and other features of the present invention will become readily apparent in view of the accompanying drawings and the detailed description of the embodiments.

FIG. 2A is an illustration of exemplary buttons available in a toolbar according to one embodiment of the invention;

FIG. 2B is an exemplary Repository tree according to one embodiment of the invention;

FIG. 6 an exemplary Visual Editor panel according to one embodiment of the present invention;

FIGS. 11A–11E are exemplary windows for publishing reports according to one embodiment of the present invention;

FIG. 12 is an exemplary legend position selector according to one embodiment of the present invention.

DETAILED DESCRIPTION

Figure 1A:
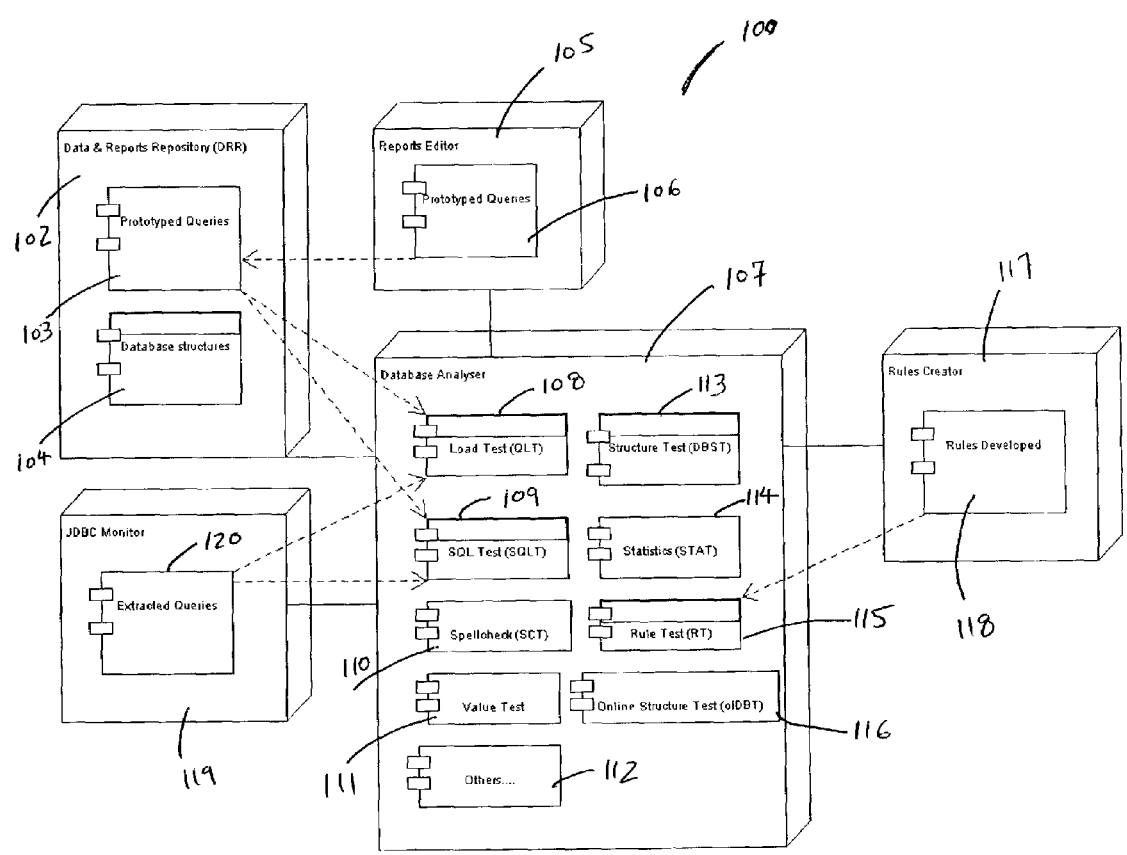
FIG. 1A is an exemplary system block diagram, according to one embodiment of the present invention.

In one embodiment, the present invention is a method and system for testing databases and database oriented software applications through analyzing database contents and structure. The method and system provide a framework for various tests, which can be deployed against the database structure or contents. The system provides a set of ready to use tests but custom tests can also be written using system API. Tests used within the framework constitute test suits. Test suits can be used during database oriented application development process for regression testing, verifying newly added functionality, re-testing of existing and modified functionality, deploying new versions of an application. Test suits can also be used for database monitoring and database cleaning.

The Internet has recently been popularized by the rapid success of the World Wide Web (WWW or Web). The Web links together a variety of computers from around the world and various topics in a non-sequential web of associations which permit a user to browse from one topic to another, regardless of the format and order of topics. Users access and browse the Web using a web browser that generally resides and is executed on the user's computer. Commercially available web browsers such as Netscape's Navigator™ and Microsoft Internet Explorer™ are common and accessible by computer users. The web browser allows a user to retrieve and render hyper-media content from the network of computers within the Web, including text, sound, video and other types of data. These hyper-media contents are stored on different web sites.

Web sites are locations on server computers that are accessible through Internet. A variety of information, such as hyper media contents and databases can be stored on a web site and be access by users with computers connected to the Internet. One of the applications of the Web is its capability to link a web site with a database so users can search for information. In essence, the web site becomes the user UI for database applications enabling a user to select search criteria and execute searches of a database that resides on a remote computer. To serve up pages, web sites need a server (a host computer) and server software that runs on the Server. The host computer manages the communication protocols and houses the pages and related software required to create a web site on the Internet. Host computers spread throughout the Internet can house different web sites.

The Internet works based on a client/server model. In this model, a client computer communicates with a server computer on which information resides and the client computer depends on the server to deliver requested information and services. These services may involve searching for information and sending it back to the client, such as when a database on the Web is queried. Other examples of these services are delivering web pages through a web site, and handling incoming and outgoing e-mail. Typically, the client is a personal computer (PC) user using a browser to connect to and search the servers. The servers are usually more powerful computers that house the data and databases. The client/server model enables the Web to be conceived of a limitless file storage medium and, distributed among thousands of host computers, all accessible by any individual computer user.

The web site and the servers that make up the World Wide Web need to have unique locations so that a client computer can locate and retrieve information and web pages. For example, the unique identifier for a host computer is called IP (Internet Protocol) address and the unique identifier for a web site (web page) is called the URL (Uniform Resource Locator). A URL indicates where the server computer is located, the location of the web site on the server, and the name of the web page and the file type of each document among other information. Typically, when a site is published, files from a source (location of files that are being modified) are transferred to a target (location of the site server). Publishing sites (pages) makes them publicly accessible. A web-based application is an application software that uses a browser as its front end and common gate interface (cgi) programs as its back-end. This document uses the term "site" to refer to web sites, intranet sites, extranet sites, and web-based applications, and the like.

However, most sites today use data and information from a variety of different data sources with different interfaces. Interfacing with different data sources and allowing transfer of data between them is a difficult and time-consuming task that generally require software expertise to accomplish. The software tool of the present invention provides a user with capabilities to test and interface with a variety of different data sources, without being a database or web expert.

In one embodiment, the present invention is a software tool for prototyping, testing and monitoring, for example, Java Database Connectivity (JDBC) compliant relational databases for database structure and stored data. JDBC allows the tool (and other for example, Java applications) to access multiple database management systems using Structured Query Language (SQL). The invention tests and verifies computer software which interacts with JDBC compliant relational databases.

Figure 1B:
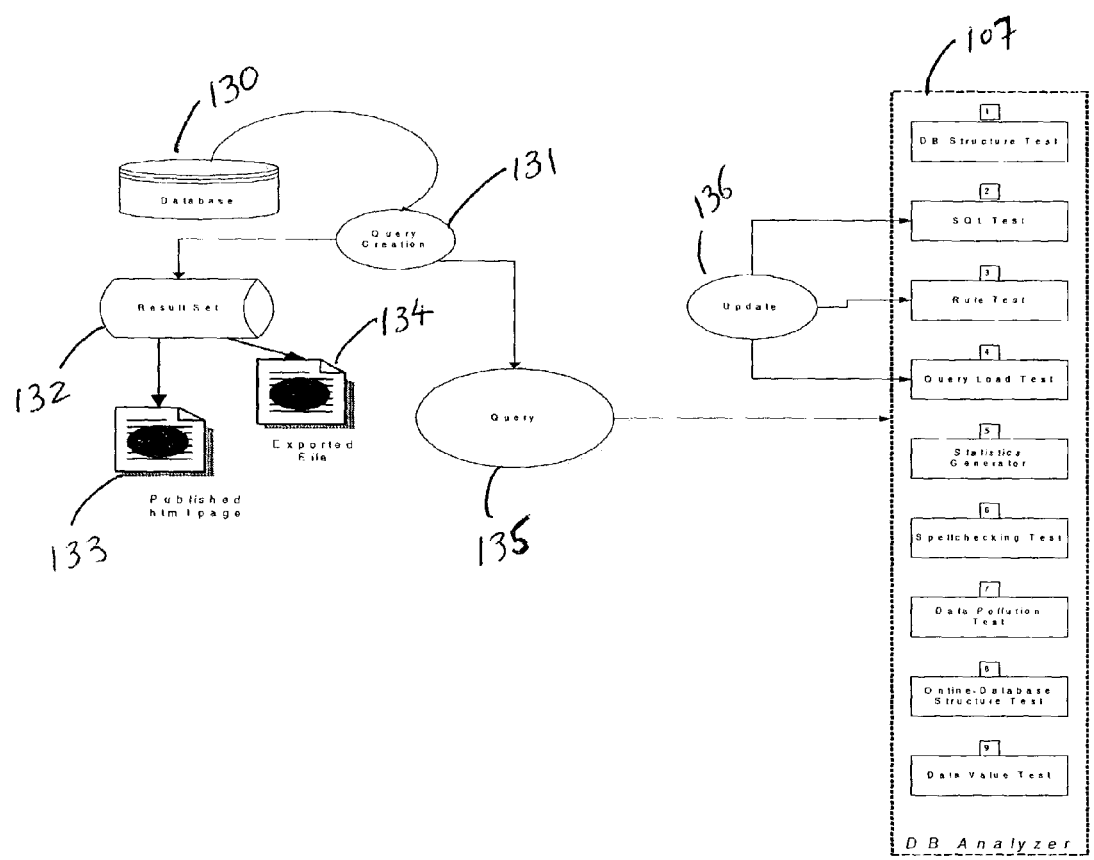
FIG. 1B is an exemplary process for testing a database, according to one embodiment of the present invention.

FIG. 1B is an exemplary process for testing a database, according to one embodiment of the present invention. Queries 135 for database 130 are created in 131 and the results are gathered in result set 132. The results can then be published as an HTML page 133, and/or exported as exported files 134, to other applications. Queries 135 are tested by a database analyzer 107. Depending on the test, the test results may be updated in 136.

FIG. 1A is an exemplary system block diagram, according to one embodiment of the present invention. In this embodiment, the system 100 includes the following components.

A Data & Reports Repository (DRR) 102 stores and manages database structures 104 and prototyped SQL queries 103. A Report Editor (RE) 105 is responsible for prototyping SQL queries 106. RE 105 hides SQL syntax details from the software developers, allowing the developers to focus on issues like what needs to be obtained from the database and according to what types of conditions. RE can be used for rapid verification of database records by preparing ad hoc queries and analyzing the results. RE can also help in building more advanced queries. Once built and verified, the queries can be stored in DRR for future reference.

As shown, the system also includes a Database Analyzer (DA) 107 that provides a framework for executing single tests, building test suites and playing back test suits. The Database Analyzer 107 includes a set of ready to use tests of various types, described below in more detail.

A Rules Creator 117 creates patterns of relational structure (rules) 118 to be detected later in actual database structure. A JDBC Monitor (JM) 119 monitors the interaction of the software application (which uses JDBC to connect to a database) with the database. JM is useful for profiling software application and for extracting SQL queries to build further test suits. Typically, to use monitoring to profile the interaction between the application software and the database, a user configures the software application to use jdbc proxy driver, the software application is then used in the intended way while jdbc proxy driver monitors jdbc calls, the results are then analyzed, for example, using a GUI. Additionally, the user can use recorded SQL queries while monitoring jdbc calls to build test cases for further system testing.

A JDBC monitor can record SQL sentences sent to database and retrieved rows in return. This allows for monitoring of the application software which results in optimizing how the application communicates with the database. During the development cycle of the application, typically the way in which the application communicates with the database tends to be inefficient. For example, if a developer wrote a procedure "getUserData(user_id)" which returns all data regarding user account where user_id identifier is known, such procedure in the worst case may initiate a connection to the database, send a query for user data then, retrieve data and close connection to the database. Now, if another developer wanted to show a list of user names by writing a code, which in a loop, calls that procedure. Such approach works because all user data are indeed returned to the application. However, this approach is inefficient, because each loop iteration opens new connection to the database, performs query, then closes the connection. Monitoring of JDBC calls can show that the connection is opened and closed too many times. The developer utilizing the monitoring results, can optimize the code by opening the connection once, retrieving the data for all users and then, closing the connection. Another advantage of profiling is when performing a query which returns a variety of different data. In this case, not only the query itself may be inefficient, but also, sending the data back to software application may not be optimized. When monitoring JDBC calls with the DR, a developer can see which parts of the JDBC calls took the longest time, or were used too many times, and thus optimize the code for that particular data exchange.

For example, when a developer builds a software application, which among others, register web users into a database, the developer defines a connection to the database engine using a JDBC driver (data source). DRR 102 reads the already existing database objects and presents them as a tree. The developer then uses the DRR to add new table(s), as required by the design. One of the system advantages is that the developer can start testing the process at this point. The developer uses DA 107, and the Rules Test 115 to check the prototype structure against patterns for enforcing desired design practices. The rules under test may be naming conventions, rules related to used column types, rules related to portability among various database vendors, etc. This provides the developers with an ability to easily define custom rules, or customize existing rules to meet their particular needs.

Once the created table is checked with Rules Test 115, the developer can start prototyping SQL queries. In this case, the developer populates a new table with some data and uses the prototyped queries 106 of the Report Editor 105. Using drag-and-drop technique, queries are built for various usage patterns, for example, reporting on users created patterns, fetching single user information, searching for users using given criteria, etc. The advantage of such approach is that in this early stage, the developer may find out that the proposed database structure requires rework for more convenient data access, reducing data redundancy, and/or better performance. Prototyped queries 103 can be stored in DRR 102 for use within the software application and for load testing (Profiling) using, for example, DA Load Test 108.

Once the database structure and SQL queries are prepared, verified and profiled, the developer creates software to implement a desired functionality within a software application. During this process, the developer can use RE 105 for verifying that correct data is stored in the database. Using JM 120 (e.g., for applications written in Java programming language), the developer can monitor how the software actually interacts with the database. Using the JM, the developer can profile the software application for optimization. During profiling, data sent to and received from the database is observed (e.g., to check whether there are too many queries, or unnecessary queries), and the actual SQL queries are extracted and played within the Load Test 108 to profile the query itself (optimal queries). One advantage of this process is that the monitoring of the software application (JM) and the profiling of SQL queries are combined together.

The verified and optimized software application is then passed to a QA department for developing and performing QA tests on the software. While being tested, the database needs to be observed as well to detect errors in database records. While verifying the data in the database during test phase, the QA department can leverage the effort invested in observing the behavior of the software application and build test suites to prepare for further software monitoring, after deployment of the software application.

As a result, the process using the software tool of the present invention is capable of detecting software errors by detecting problems in database records and building suitable tests from the prototyping phase through coding phase, and after deployment of the software application.

In one embodiment, the DA 107 includes the following test modules. A DB Structure Test (DBST) 113 compares database structure with recorded pattern and points differences to avoid uncontrolled modifications. The DBST checks whether a database matches a previously-recorded "control" database structure (from the same database at an earlier time, or from a different version of that database). For example, this test may be used to record the correct database structure, and then ensure that the database does not deviate from the structure as it evolves. This test can also be uses to keep the development database in line with the production database. A SQL Test (SQLT) 109 verifies that database returns the expected results as the database evolves. The SQLT first records results of a given SQL query and then compares them against subsequent executions. For example, this test may be used to verify that no records returned from a certain query have a null or zero value, or that a particular complex query always returns the same results. SQL Tests can check any database requirement that can be verified by determining whether the results of an SQL query change over time.

A Rule Test (RT) 115 verifies that the database design satisfies recommended best practices and/or customized design rules. The RT matches patterns designed with a Rule Creator against actual database structure and triggers warnings whenever a match is detected. Each rule expresses a database design error/problem as a pattern. When a Rule Test is run, the present invention checks whether the database matches any of the specified rule patterns. Each time an occurrence of a rule pattern is found, an error is reported.

Additionally, a Query Load Test (QLT) 108 verifies database performance and scalability with respect to prototyped or actual application SQL statements. The QLT executes SQL statements against database and compares timing results with given limits. Executions of the SQL statements can occur in loops, in parallel for several SQL sentences, or in sequential order. The QLT identifies potential bottlenecks caused by hardware, the database, or the way the software application interacts with the database. The QLT provides profiling information about connection time, first row returning time and subsequent rows returning time. A Statistics Generator (STAT) 114 collects information about database engine properties and database structure.

Specifically, this test analyzes and reports database engine parameters such as, database object creation constraints, SQL features, database name and version, as well as, statistical data about database objects which includes table statistics, column statistics, and index statistics. Using the STAT 114 from the early stages of development helps gaining a better understanding of the database state and structure. Additionally, monitoring database statistics sometimes exposes design flaws (for example, overuse of types that are not always the best choice, too many or too few indices, etc.).

A Spell checking Test (SCT) 110 verifies that no misspelled words exists in the database. The SCT scans through the specified fields of the database and checks the spelling of the records it finds. A Data Pollution Test (DPT) (shown as part of the other tests 112) verifies that no incorrect or poorly-formed data exist in the database. The DPT includes modules for detecting non-printable characters in database text column, playing script tests on column contents, and playing script tests on combination on columns. Any valid script in a supported language can be provided to DPT thus, allowing greater flexibility. The DPT scans through the fields of the database specified by the user and checks whether data contained there conforms to the restrictions defined in the test properties. For instance, the test can detect the presence of unacceptable characters or can check whether the data in specific fields use the proper email address or telephone number format. The DPT includes modules to detect illegal data in the database (e.g., undesirable characters).

An On Line DB Structure Test (olDBT) 116 verifies that multiple database structures remain in sync. The olDBT reads database structures for several data sources comparing them to each other and reporting any differences, thus helping in for example, elevating the software application from the development to production environments. A Data Value Test (DVT) 111 verifies that single value returned by database query remain in defined limits as database evolves thus, monitoring for example, data growth or consistency. This allows testing whether numerical data satisfies specific requirements, as the database and the software application evolve. For example, the test can be used to check whether the price for a specific item falls within a required range, or to check whether the range or the value in a certain field falls within a required range.

In one embodiment, the JDBC Monitor includes the following modules. A proxy (JDBC) Driver which records and logs, through a Logger, every call to JDBC objects along with execution time, stack trace, thread information, object type, object instance, method called, method invocation parameters, and returned values. The Logger sends monitored information to a text file, compressed files and a (JDBC) Monitor Console through TCP/IP. The JDBC Monitor Console manages the monitoring of parameters, presents recorded results, and exchanges recorded data with the rest of the software application.

The proxy driver works like a wrapper around the original JDBC driver. That is, whenever a user calls any method from the code, the proxy driver first performs all tasks necessary for proper monitoring, and then passes the call to the original JDBC driver. Also, whenever user code requests the creation of a connection, a proxy connection object is created that wraps around the original Connection object. Similarly, calls to the proxy connection object first pass through the monitoring infrastructure and then are passed to the original connection object. Wrappers are created around other JDBC objects such as Statements, Prepared-Statements, and Result-Sets. As a result, all calls to methods of any JDBC object can be properly monitored.

Figure 1C:
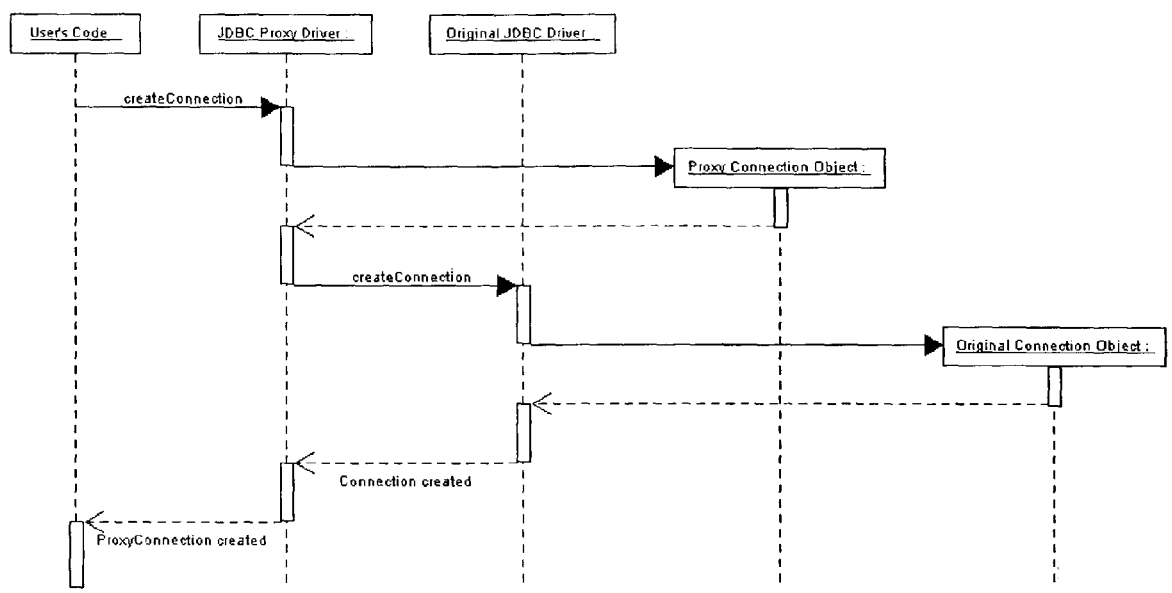
FIG. 1C is an exemplary proxy object creation process, according to one embodiment of the present invention.

Wrappers typically use Java reflection mechanism to pass calls from within the user code to original objects. As a first step, the user configures the software application to use a proxy driver, instead of the original driver, passing information about original driver to the proxy driver. Then, when the user code performes a call to the proxy driver, e.g., "create connection," the proxy driver first creates proxy connection object (FIG. 1C). Then the proxy driver calls the original driver "create connection" method, which returns the original connection object. The proxy driver then passes the original connection to the proxy connection object and returns the proxy connection object. By doing so, the proxy driver can store the information that "create connection" had called. For example, information about the location in the user's code, the arguments used, the completion time, and the like can be stored. As a result, a connection is returned to the user's code, wrapped inside the proxy connection object, which allows for further monitoring using the same schema.

An exemplary proxy object creation process is represented in FIG. 1C. First, the user requests a connection object from the JDBC Driver. The proxy driver creates a proxy connection object, and then passes a call to the original JDBC Driver, as shown. Then, the original driver creates a connection object and returns it to the proxy driver. Next, the proxy driver uses the proxy connection object to "wrap" the original connection object, and then returns the proxy connection object to the user's code, as shown.

The Message Exchange Server (MES) module of the JDBC monitor is designed to exchange messages between the proxy driver and the monitor console (GUI). When the proxy driver is first invoked, it connects to a MES, registers as a source of monitoring information, and subscribes to controlling messages coming from the GUI. Instead of connecting directly to the proxy driver, the GUI connects to MES, registers as a source of controlling messages, and subscribes to monitoring information. This way, a user can manage several proxy drivers at one time using the GUI. The user can start and stop monitoring, define the level of detail for monitoring, define the amount of data reported, etc. The user is able to see the output gathered from several database JDBC monitors simultaneously in the GUI.

The monitor console of the JDBC monitor is responsible for managing proxy drivers, presenting monitored information to the user, and exchanging this information with the rest of the software application. Proxy driver management involves starting and stopping monitoring, defining the level of monitoring details, defining the amount of data reported, etc. Monitored data is presented to the user as a table with each row representing one reported JDBC call, or as a text report. Other types of reports such as, HTML reports, charts, XML reports, CSV reports, etc. are also possible. The GUI can also feed monitored data to other subsystems for data exchange. This data exchange allows automatic building of tests (such as load tests) out of monitored SQL statements.

The users may access these features from a GUI within the software tool of the present invention. The GUI is composed of multiple task-oriented panels as well as several components common to the various task-oriented panels. Before a user starts creating reports, the user adds and perhaps customizes the data source that the reports will be based on. At this point, the user adds the data sources and automatically determines some basic relations between the tables of the data sources. The user may also want to start customizing the data source by adding tables and fields, creating filtered data sets, modifying records, creating pre-assembled sets of columns, etc. Such customization, however, is optional.

In one embodiment, the features and options are organized into common and task-oriented panels. Each task-oriented panel provides access to all the features and functions related to a specific task (such as creating a report, viewing a data source, or creating a report template). Preferably, only one panel is open at a time.

Figure 13C:
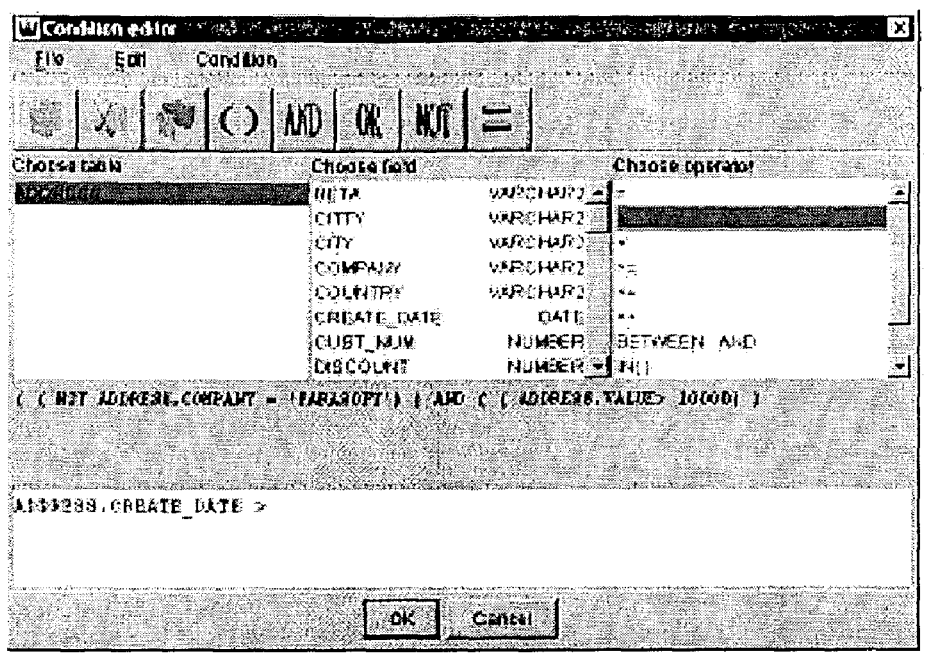
FIGS. 13A–13O are exemplary windows for various GUI functions according to one embodiment of the present invention.
Figure 13D:
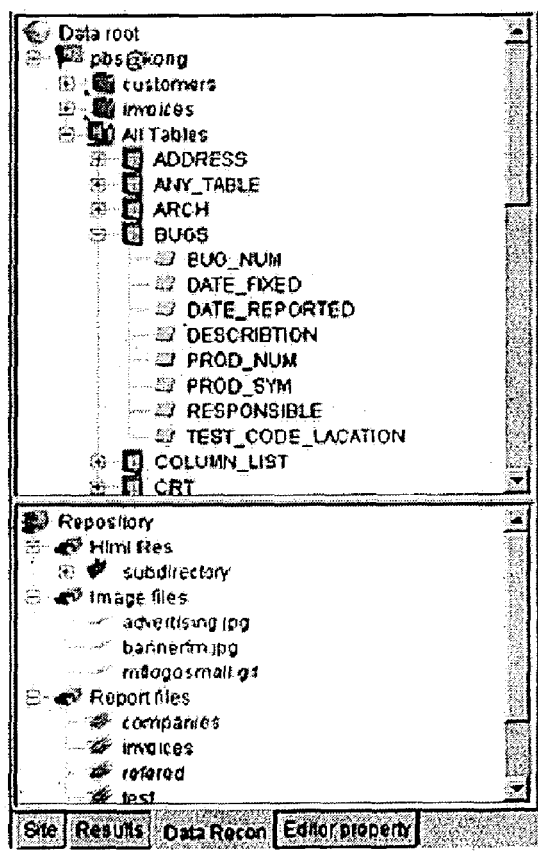
Figure 13E:
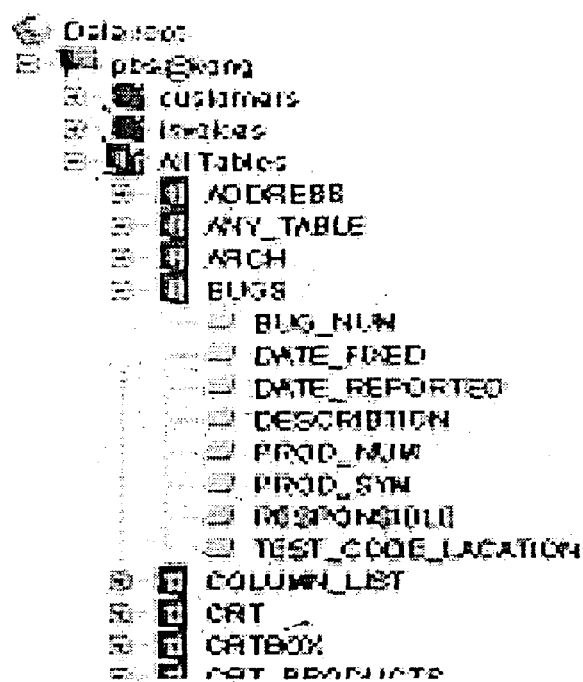
Figure 13F:
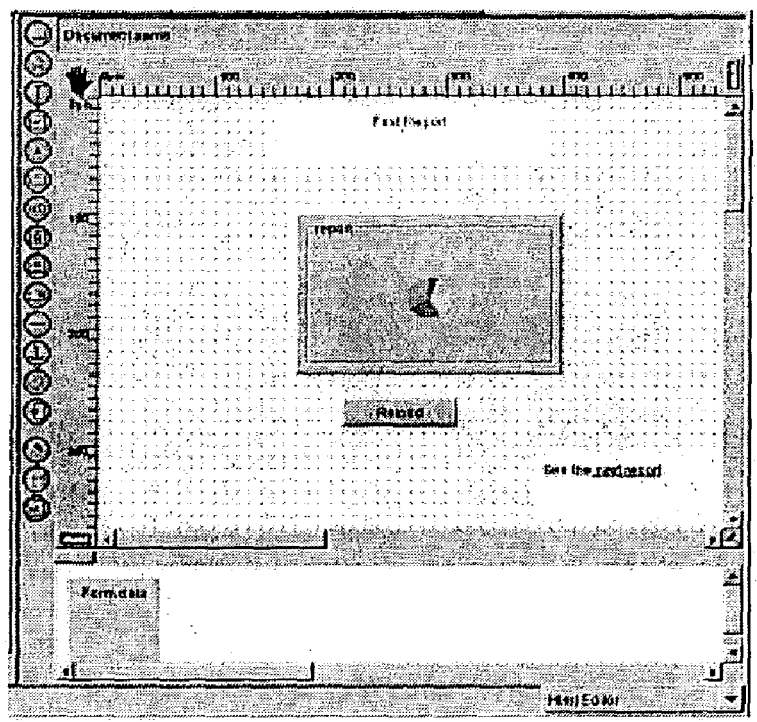
Figure 13G:
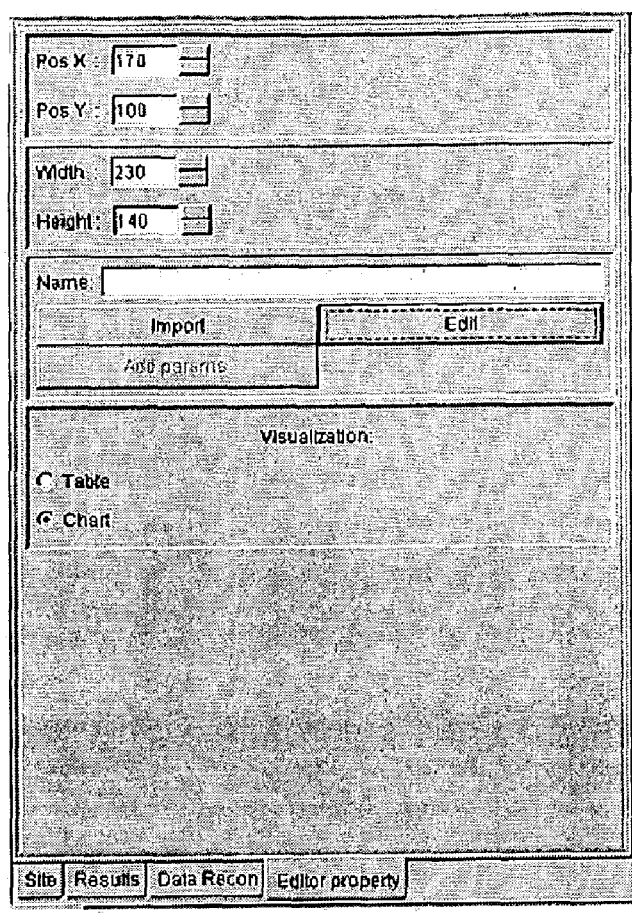
Figure 13H:
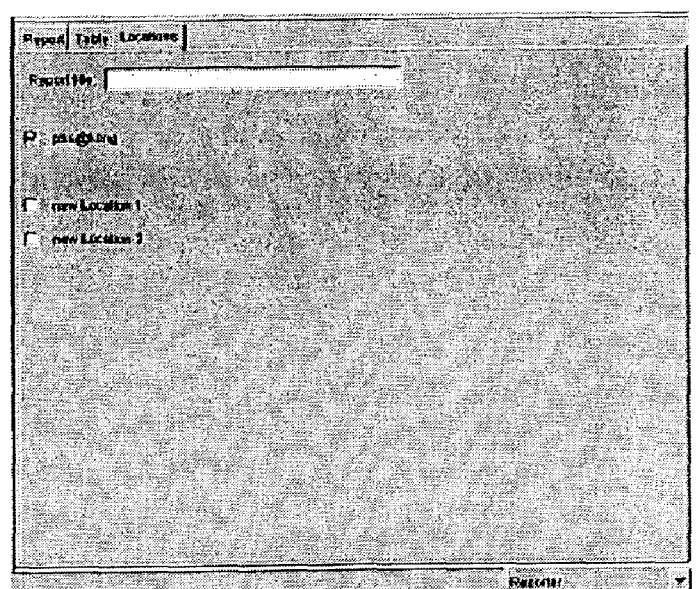

GUI panels include:
Report panel: Where reports are created, as shown in FIG. 13K.
  Visual Editor: Where report templates are created, as shown in FIG. 13F.
  SQL Panel: Where the records in a data sources are viewed and/or modified, as shown in FIG. 13N.

In addition, elements that are common to more than one task (such as a representation of a data source and a file storage area) are available at all times. These common elements are available in a tab within the GUI. This tab includes two components:
Data Source tree: Represents a selected data source in a tree-like structure, as shown in FIG. 13E.
Repository tree: Represents tool-related files in a tree-like structure, as shown in FIG. 13L.

Dragging a node to or from one of these trees is often a quick way to perform a function. For example, dragging a Data Source tree node to the Report panel adds a column to a report, and dragging an icon from the Visual Editor to the HTMLs branch of the Repository tree saves the current Visual Editor project as a report template. In addition, the user can reach a multitude of functions and options through the shortcut menus built into each GUI component. Shortcut menus can be accessed by right-clicking a GUI component such as a panel or tree. Each shortcut menu is tailored to contain only options relevant to the component that it is associated with, thus, right-clicking different components will open shortcut menus containing different options.

FIG. 2A shows exemplary buttons available in a toolbar in one embodiment of the invention:
Report: Opens the Report panel, which allows composing reports that can be added to report templates.
Visual Editor: Opens the Visual Editor that allows creating report templates that are used to produce desired dynamic or static reports.
SQL Panel: Opens the SQL Panel that allows viewing and modifying records in a selected data source.
Easy DR: Opens a panel allowing the user to access a report creation wizard and tutorial.

A Repository tree, shown in FIG. 2B, stores all reports and report templates generated, as well as, all supporting files used to create tool files.
The Repository tree includes four main branches:
HTML files: Contains report templates that are ready to be added to a site as dynamic reports or static reports. All report templates created and saved in the Visual Editor are stored here.
HTML templates: Contains HTML templates that standardize the format of report templates.
Image files: Contains image files that are used in report templates.
Report files: Contains report files that are saved from the Report panel. All reports in this branch can be dragged into the Visual Editor. The user can add some reports directly to the site tree and immediately publish them as dynamic or static reports; the tool automatically generates a basic report template for such reports.

The Repository tree represents the contents of the html_templates, htmls, images, and templates in the user directory. To add files created within the tool to the Repository tree, the user simply drags the unused area (of Report panel's Report tab shown in FIG. 13J) or a hand icon (in Visual Editor) into the branch in which to save the file. Report files are saved in the Report Files branch; report templates are stored in the HTMLs branch. To add files created outside of the tool (for example, a template of a site's web pages) to the Repository tree, Windows Explorer™ or file copy commands may be used to move the file(s) into the appropriate subdirectories (html_templates, htmls, images, or templates).

The user can open any tool file stored in the Repository tree by dragging it from the Repository tree to the appropriate panel. For example, a report template file can be opened by dragging it to the Visual Editor panel, and a report file can be opened by dragging it to the Report panel.

To rename a node in the Repository tree, a user right-clicks the node to be renamed, chooses Rename from the shortcut menu that opens, then types the node's new name. To remove a node in the Repository tree, the user right-clicks the node to be removed and chooses Delete from the shortcut menu that opens.

The Data Source tree contains all data sources that have been added to the tool. In one embodiment, the Data Source tree contains the following components:
Data Root: is the root element of the Data Source tree. It may contain data sources. For example, the data root may contain Sales data source, Marketing data source, Development data source, and Public Relations data source.
Data Source: defines database connections. It may contain one or more data sets. For example, a data source might contain an All Tables data set, then several other data sets that contain only selected tables.
Data Sets: may contain database tables. For example, a data set might contain a Customer table, an Items table, an Items_sold data table, and a Staff table.
Tables: may contain fields. For example, the Staff table might contain the firstname field, the lastname field, the email field, and the phone_extension field.
Fields: may contain records for a specific field within in the database. For example, the email field would contain records of e-mail addresses.

If the Data Source tree does not contain the data source(s) to use in a report, the user needs to add the desired data source or open a previously saved Data Source file before beginning to create a report.

Figure 3:
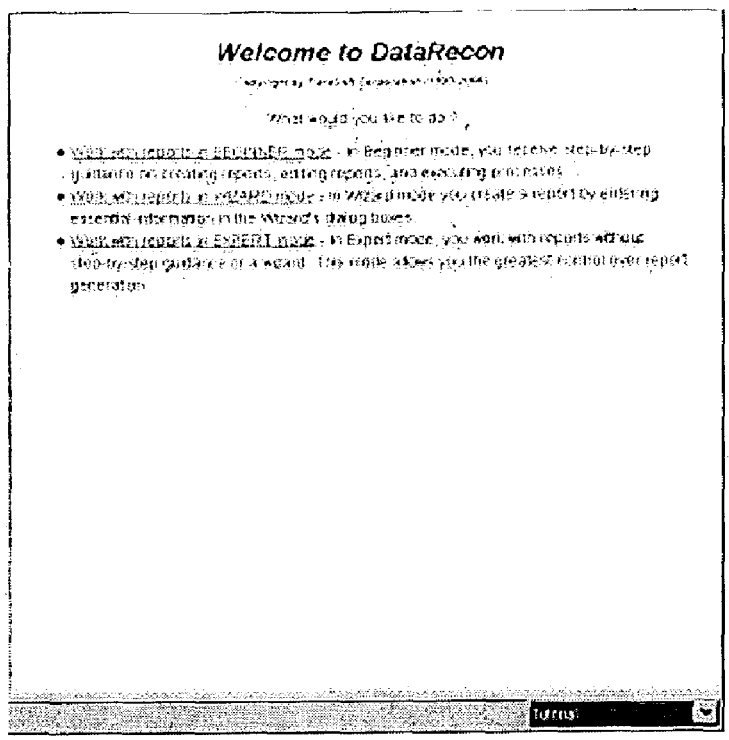
FIG. 3 is an exemplary Tutorial panel according to one embodiment of the invention.
Figure 4:
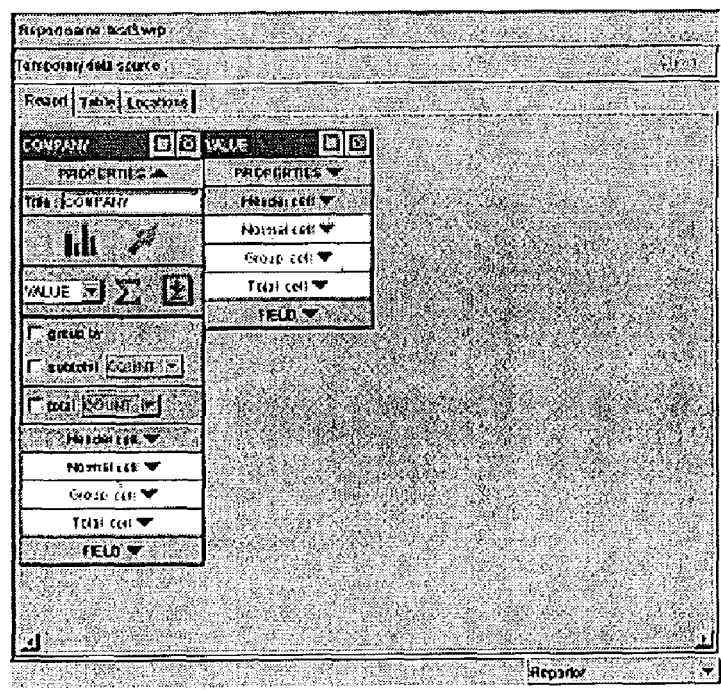
FIG. 4 is an exemplary Report panel according to one embodiment of the present invention.
Figure 5A:
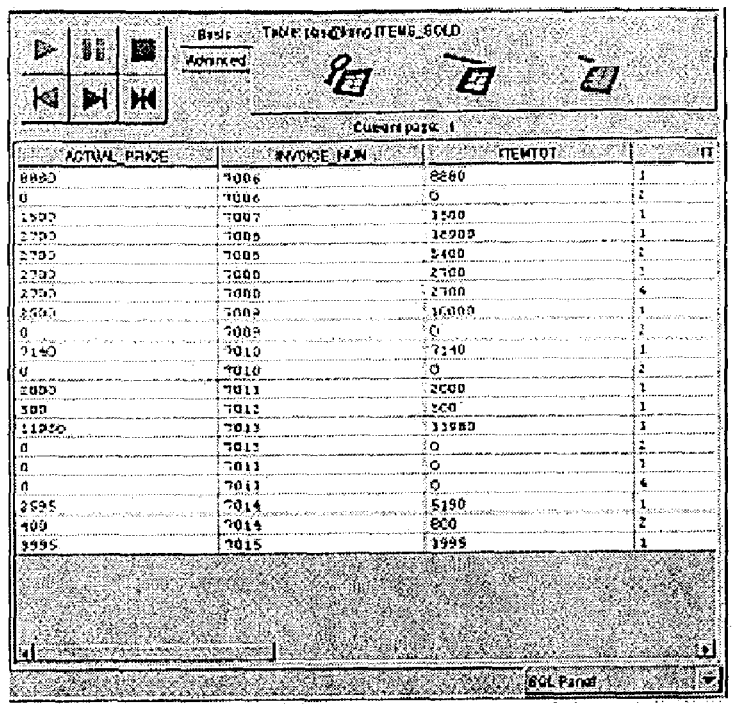
FIGS. 5A–5B is an exemplary SQL panel according to one embodiment of the present invention.
Figure 5B:
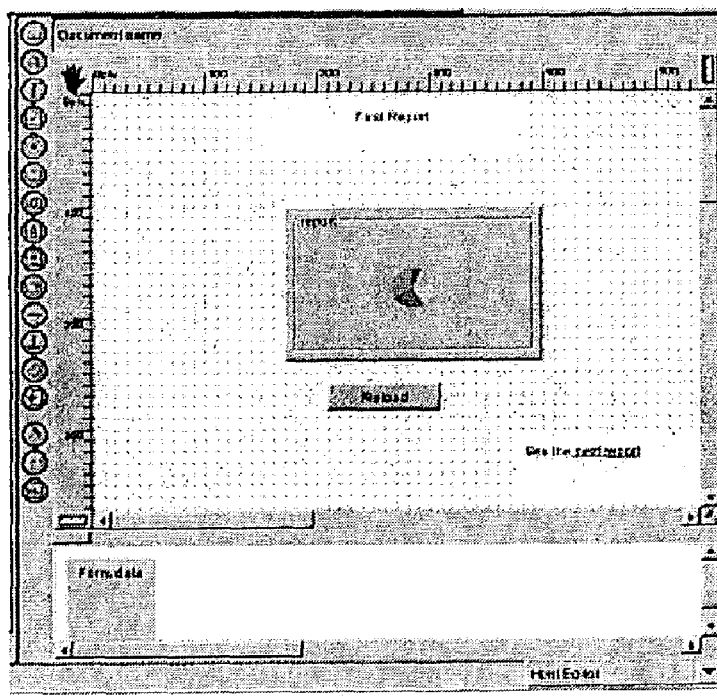
Figure 6:
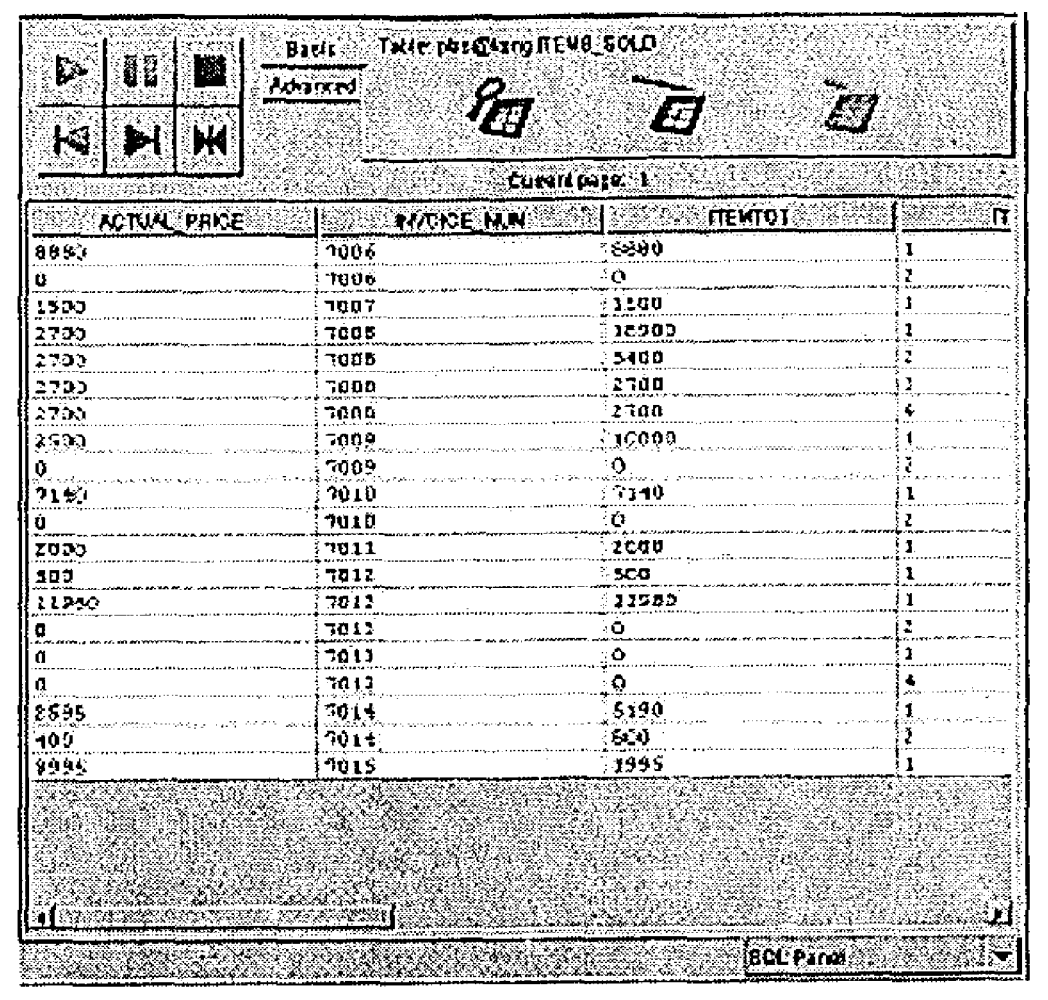

FIG. 3 is an exemplary Tutorial panel. This panel lets users access Beginner Mode and Wizard Mode, two modes of guided report creation. To open this panel, a user click the Easy DR button in the tool bar, shown in FIG. 1. FIG. 4 is an exemplary Report panel. This panel is where users create, preview, and modify reports. This panel opens by clicking the Report button in the toolbar. FIG. 5 is an exemplary SQL panel. This panel lets the user view and/or modify contents of their current data source. To open this panel, the SQL Panel button in the toolbar is clicked. FIG. 6 is an exemplary Visual Editor panel. This panel let the user create and customize the report templates that will be used to generate dynamic and/or static reports. Clicking the Visual Editor button in the toolbar opens this panel.

In order to use the software tool of the present invention to design and execute reports, a user needs to first tell the tool how to connect to the data source(s) that the reports will draw information from. Once this information is specified, the tool adds a representation of each data source to the data source tree so that the user can easily drag fields and tables to the reports. The tool also converts the specified connection information into a format that databases understand, and adds this information to report templates that can generate "live" report pages.

In one embodiment, the tool uses industry standards such as Java Database Connectivity (JDBC) to connect to a desired data source. The JDBC driver manager handles multiple drivers that connect to different databases.

To add a data source:

Right-click the Data Source tree's Data Root node. A shortcut menu opens.

From the shortcut menu, choose Add Data Source. A Data Source Properties window opens.

Enter basic information about the database. What a user needs to enter depends on what type of database the user is connecting to. All databases share the following options:

Data Source Name: Enter a desired name. If the user later modifies this Data Source Name, the user will have to update the data source for all existing reports that use this data source. However, if the user anticipates changing the data source's name, a secondary name should be assigned in the Label field at the bottom of this panel. This name can be identical to the data source name. The user can later modify the name entered in Label without affecting reports.

Driver Type: Choose a driver type from this box. If the driver type is not listed here, choose Other, then add the driver in the Drivers tab.

Additional options vary depending on the type of database the user is connecting to. If the user is connecting to an undefined database, the user will typically complete the following fields:

Data Source Name: Enter or modify the desired name for this data source.

Driver Type: Choose the driver type from this box.

User Name: Enter user name (if required by the database).

Password: Enter or modify the password (if required by the database).

URL: Enter or modify this database's URL. If the database is stored locally, the user can enter the complete path to the database.

Click OK.

The data source is now added and can be used for reports. This data source is represented by a branch in the Data Source tree. After a data source is added, the user can use the tool to add tables and/or fields to both the Data Source tree and the actual data source. To add tables and table fields:

Right-click the All Tables node of the Data Source tree. A shortcut menu will open.

Choose Add Table from the shortcut menu. The New Table panel will open.

In the Table Name field of the New Table panel, enter a name for the new table.

To add a field to the new table, click the New Field button, then enter field properties in the window that opens.

Repeat the above step until all desired fields are added.

When done adding fields, click OK

To modify a field's properties, select the field to be modified in the New Table panel, click the Modify Properties button, then modify the field's properties in the window that opens. To remove a table row, select the row to be deleted in the New Table panel, then click the Remove Row button. To add fields to an existing table:

Right-click the node of the Data Source tree that is associated with the table to be added to a field. A shortcut menu will open.

Choose Add Field from the shortcut menu. The New Field panel will open.

In the New Field panel, enter or modify field properties.

To view a data source's table or fields:

Click the SQL Panel button to open the SQL panel.

In the Data Source tree, locate the table to be viewed, then drag that table to the unused area of the SQL panel.

The first page of the table is then be displayed in the SQL panel. Use the bottom row of control buttons (Previous Page, Next Page, Goto) to navigate forwards and backwards among the pages. Placing the cursor over a toolbar button opens a window with the button's name. In addition to viewing all data in a table, the user can view only data that meets specified conditions. The user can enter the conditions that he/she wants data to meet in two ways:

1. By entering simple conditions.
2. Using SQL.

All conditions entered in the Basic tab are displayed as SQL queries in the Advanced tab. This feature allows the user to see how Simple Conditions translate to SQL, and also allows the user to add complexity to a simple condition entered using the Simple Conditions dialog box.

The user can restrict the data displayed using simple conditions (i.e. a specific date range, string value, etc.) by entering simple conditions in the Basic tab of the SQL panel. No knowledge of SQL is required to enter simple conditions. To view only data that meets a simple condition:

In the SQL panel, click the Basic tab.

In the Basic tab, click the Select Data button. The Select Conditions dialog box will open.

Enter the simple conditions in the dialog box.

When done entering conditions, click OK.

After these conditions are entered, the tool displays only data that meets the specified conditions. The data source will not be modified by these actions.

If users want to restrict the data displayed using queries that are too complex to be entered in the Simple Conditions panel, or if the users prefer entering all queries in SQL, they can do so using the Advanced tab of the SQL panel. If users want to restrict data displayed (rather than modify the actual data source), they need to use SQL commands that select data rather than modify data.

Users can also modify an existing record's contents while they are working in the tool environment. For example, they could use the SQL panel to change a record's value from "null" to "100". FIG. 6 is an exemplary UI for modifying a record's contents. To modify a record's contents:

Open the SQL panel by clicking the SQL panel button in the tool bar. The SQL panel will open.

In the Data Source tree, locate the node that represents the table that contains the record to be modified, then drag that node to the SQL panel. The SQL panel will display the first page of the table's contents.

Use the bottom row of navigation buttons (Previous Page, Next Page, Goto) to navigate to the page containing the record to be changed.

Select the record by clicking it once.

Click the Change Row in Table button. The Edit Table dialog box will open.

In the appropriate fields of the Edit Table dialog box, enter the new value for the record.

When done modifying this record, click OK.

To remove a complete record:

Open the SQL panel by clicking the SQL panel panel button in the tool bar.

In the Data Source tree, locate the node that represents the table that contains the record to be modified, then drag that node to the SQL panel. The SQL panel will display the first page of the table's contents.

Use the bottom row of navigation buttons (Previous Page, Next Page, Goto) to navigate to the page containing the record to be change.

Select the record to be modified by clicking it once.

Click the Remove Row button. The selected record will be removed from the SQL panel, and from the data source.

The data can also be modified using SQL. If users want to modify data displayed using queries that are too complex to performed in either of the above methods, or if the users prefer entering all queries in SQL, they can do so using the Advanced tab of the SQL panel. To do so, the users select the Advanced tab of the SQL Panel, then type the query in the text field.

In case of large data sources, a user can work with only a small subset of the tables and fields available in his/her data sources. Because scrolling and sorting through unnecessary data is usually a waste of time, the tool provides the capability of creating filtered data sets in the user's data source tree; each filtered data set contains only a selected tables and fields. This lets the user to easily focus on only the tables and fields that are important to a particular task or project. Information to be contained in the new filtered data set can be filtered out at both the table and field level.

To create a filtered data set and filter out unwanted tables:

Right-click the data source in the Data Source tree. A shortcut menu will open.

Choose Add Data Source Filter from the shortcut menu. The Data Source Filter Properties panel will open.

In this panel, specify what tables to be included in the filtered data set.

To add one or more tables:

Select the tables(s) to be included in the filtered data set.

Click the Add button to add all selected tables.

OR, to add all tables:

Click the Add All button.

Click OK to apply the properties and exit this panel.

To filter out unwanted fields from each filtered data set:

In the Data Source tree, expand the created data set until that data set's tables can be seen.

Right-click one of the tables whose fields to be filtered. A shortcut menu will open.

Choose Table Properties from the shortcut menu. The Table Properties panel will open.

In this panel, specify what fields to be included in the filtered data set.

To add fields:

Select one (or more) of the fields to be included in the filtered data set.

Click the Add button to add all selected fields.

OR, to add all fields:

Click the Add All button.

Repeat the above steps for all tables whose fields to be filtered.

Click OK to apply the properties and exit this panel.

Similar filtered data sets cab also be created using the software tool of the present invention. If a user already created a filtered data set and want to create a similar filtered data set, the user may want to duplicate the existing filtered data set, then modify it. As long as the original and new filtered data sets are similar, this is a faster and easier way than creating a new filtered data set "from scratch." To create a similar filtered data set:

In the Data Source tree, right-click the filtered data set to be duplicated. A shortcut menu will open.

Choose Duplicate Data Source Filter from the shortcut menu. The Data Source Filter Properties panel will open. The new data set is automatically assigned the duplicated data set's properties.

In this panel, make any necessary modifications.

Click OK to apply the properties and exit this panel.

Using the procedure described above, make any necessary modifications to the new data set's table's fields.

Views are pre-assembled sets of report columns which can easily be added to any table. A view can contain any combination of fields to have easy access to in the Data Source tree. Each view contains multiple fields, but the tool, in one embodiment, stores and treats it as a single field. For example, it is stored like a single field in the data source tree, and the view (including all the fields it contains) can be included in a report by dragging its node from the Data Source tree to the Report tab). To add a view to a data source tree:

Design the view by dragging fields that comprise the view from the Data Source tree to the Report tab.

Create the view by dragging the empty area of the Report tab to the All Tables node of the Data Source tree. After this is done, a dialog box will open.

In this dialog box, type the name to be assigned to this view, then click OK.

The view will then be added to the Data Source tree. How views are stored in the data source can be changed via the Data Source Properties panel. To add a view to a report, simply drag it from the Data Source tree to the Report panel.

The tool's Data Source tree represents the data source's structure at the time the tool last connected to the data source. If any structural changes are made to the data source after the tool last connected to the data source, the Data Source tree will not automatically reflect those modifications. The user can prompt the tool to reconnect to the database and refresh the Data Source tree. To refresh the Data Source tree:

Locate the data source's node in the Data Source tree, then right-click that node. A shortcut menu will open.

Choose Refresh from the shortcut menu.

The tool will then reconnect to the data source and refresh the data source tree.

In one embodiment, the tool automatically saves the current data source's representation and connection properties when the user exits the tool. The tool also restores this data the next time the user opens the tool. The user can also manually save and restore a data source. For example, if the user uses multiple data sources to create reports, he/she may want to save each of the data source so it can easily be restores when needed. To save a data source as a data source file:

Right-click the unused area of the Data Source tree. A shortcut menu will open.

Choose File> Save or File> Save As from the shortcut menu. The Save dialog box will open.

In this dialog box, type or select the name and path to be assigned to the Data Source file.

Click Save.

If a user wants to create reports using a data source that does not appear in his Data Source tree and that he has saved as a Data Source file (.dsd file), the user can bring that data source into his Data Source tree by opening the .dsd file. If there is no .dsd file for the Data Source to be opened, the user needs to add that data source. To open a data source file:

Right-click the unused area of the Data Source tree. A shortcut menu will open.

Choose File> Open from the shortcut menu. The Open dialog box will open.

In the dialog box, type or select the Data Source file (.dsd file) to be opened.

Click Open.

The data source is now opened and can be used for reports. This data source is represented by a branch in the Data Source tree.

Relations between and within data sources are typically the crux of relational databases and the software tool of the present invention. Relations allow accessing and reassembling the data in many different ways. This, in turn, allows creating reports containing the precise information that the user is interested in. For example, in the case of a sales database which stores information in a number of different tables, one table may contain customer name, company, address, phone number, e-mail, and customer number fields. Another table may contain purchase amount, product number, and customer number fields. These two tables are related because they are both organized by the same customer number field. Because these fields are related, the user can produce a report that shows how much each company purchased. If these two tables were not somehow related (i.e. they did not share any fields), the user would not be able to produce such a report. The preferred way to determine relations is to have the tool determine relations automatically, then manually perform any required adjustments.

To determine relations automatically:

In the Data Source tree, right-click the node that contains the data source's name. A shortcut menu will open.

Choose Data Source Properties from the shortcut menu. The Data Source Properties panel will open.

Click the Relations tab of the Data Source Properties panel.

Choose the appropriate option. The following table shows a list of options:

TABLE I

| If database is like this . . . | This needs to be done . . . |
|---|---|
| Always or usually uses keys to indicate relations | Select Find relations automatically and Guess relations by database keys |
| Sometimes uses keys to indicate relations, but does not use keys consistently | Select Find relations automatically, Read keys from database, and Guess relations by type and name |
| Never uses keys to indicate relations | Select Find relations automatically and Guess relations by type and name |

(Optional) Determine which relations to suppress.

To prevent the tool from using relations for certain fields that should not have relations, enter the relation to be suppressed in the Suppress name field, then click Add. Specific fields can be entered, or wildcards can be used to suppress relations for a group of fields. For example, the user could suppress relations for all fields containing the string "DataRecon" by entering "*DataRecon*".

To modify an existing suppression, select the suppression to be modified in the Suppress relations list, make the modifications, then click Modify.

If it is desired to remove an existing suppression, select the suppression to be removed in the Suppress relations list, then click Remove.

Click OK. The tool then re-examines the data source and automatically establishes relations in the selected way.

The tool can establish many relations automatically. In one embodiment, the tool uses appropriate "join" condition in a WHERE clause in SQL query to make more sophisticated queries over several tables. For example, suppose there is one table "employees" with employee_id as a unique identifier, and another table "salaries" with "employee_id" refereing to employee table and additional fields such as year and income. In order to find out total income for employee "John" one should use something like this: select sum (income) from employees, salaries where employee.name ='John' and employees.employee_id =salaries.employee_id. The last condition in WHERE clause is responsible for a proper join of two tables so no other income is summarized, and only the one for employee "John" is summarized.

However, it is not necessary to bother a user with such details as long as it is not necessary. Modern databases allow to store information about relations as a pair of primary and foreign keys. In the example above, employee_id is a primary key for a table employees and foreign for s table salaries. The standard approach so is to read foreign and primary keys from database and establish relations between tables based on this information. Sometimes however, such information is not stored in a database because of poor design, database software limitations or other reasons. Thus, the tool is trying to guess relation based on fields types and names.

For example a field which is numerical and has "id", "ident" in it's name can potentially create relation between two tables. On the other hand, a field with a name "note", "notes", "date" is very unlikely to create a relation. Similarly, fields need to be of the same type and the same name to be a good candidate to create relation. It is unlikely that two fields with different types create a relation or that they have different names in different tables. Additionally a user has an options to suppress certain fields from being used in relation guessing. For example, if one of the databases had a field "status" in each table—this is not a good field to create relations based on.

However, it may be necessary to determine some relations manually. Some instances when the user would have to manually determine relations include:

If the user needs to establish relations between data sources.

If the user's database does not use keys and its fields and tables have inconsistent names and types.

If when previewing a report the user receives a warning message about unrelated tables.

Figure 13I:
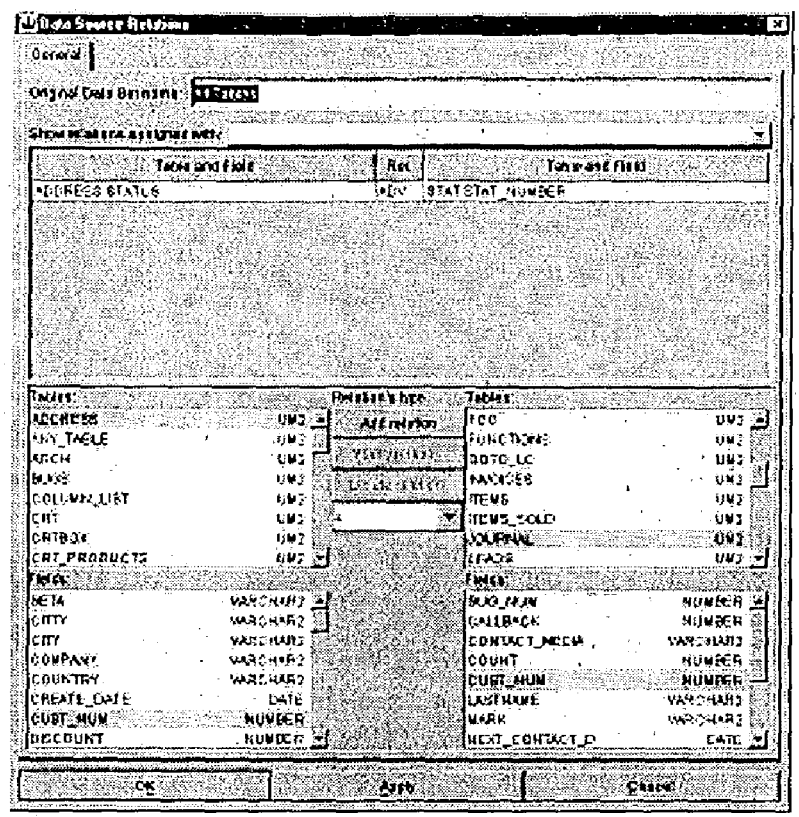
Figure 13J:
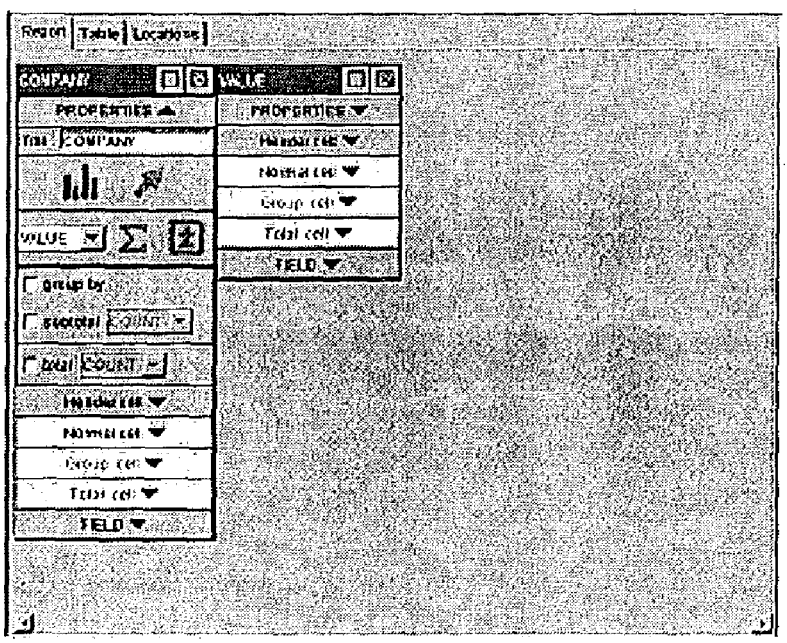
Figure 13K:
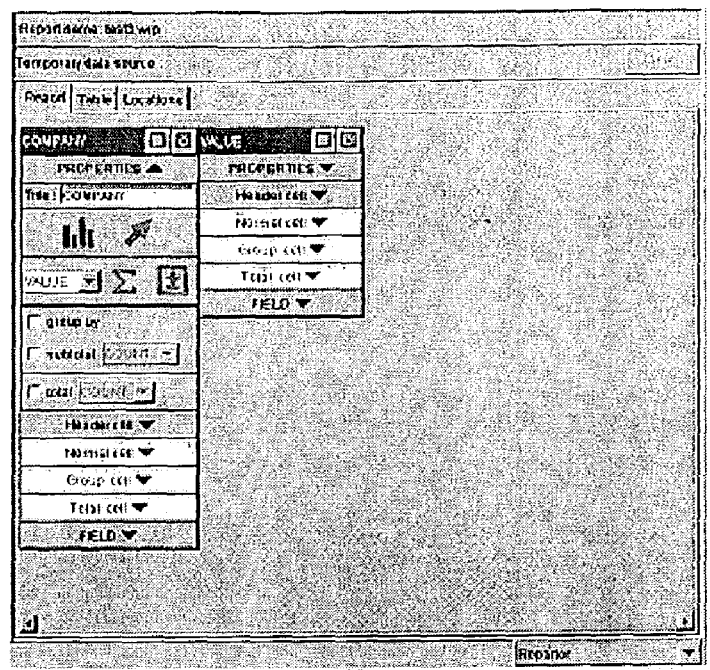
Figure 13L:
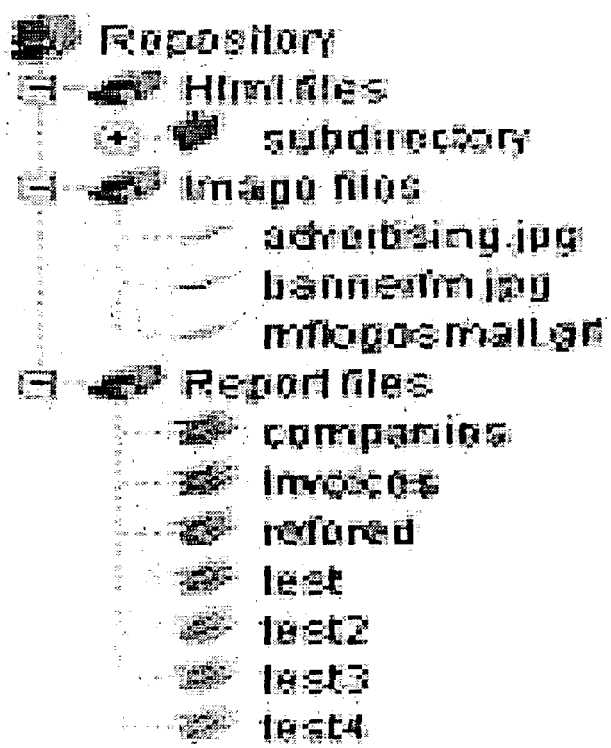
Figures 13M, 13N:
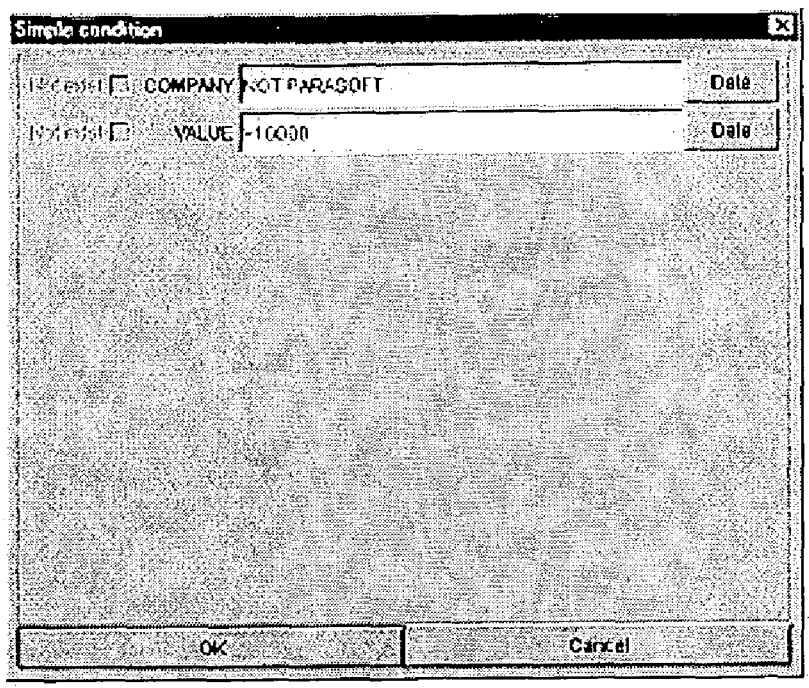

To determine relations within a data source, use the Report Relations window, as shown in FIG. 13I. This window can be opened by right-clicking the All Tables node of the Data Source tree, then-choosing Data Source Relations from the shortcut menu. To determine relations between data sources (for example, if producing a report using fields from two different data sources), use the Relations Between Data Sources window. This window can be opened by right-clicking the Data Root node of the Data Source tree, then choosing Relations Between Data Sources from the shortcut menu. To determine relations within a report (for example, if producing a report that requires relations other than those established for the data source as a whole), use the Report Relations window. This window can be opened by right-clicking the unused area of the Report tab containing the report to establish relations for, then choosing Show Relations from the shortcut menu.

To add a new relation:
Open the appropriate Relations window (see above procedure).
In the Tables lists of the Relations window, click the two tables that contain the fields for which a relation to be defined. Choose one table from each list.
In the Fields lists, click the two fields for which a relationship to be defined. Choose one field from each list.
From the Relation box, choose the option that corresponds to the relation to be established between the selected fields.
To establish equality: for example, the log_name field in one table is equal to the log_name field in another table. To establish equality, choose "="
To establish other relations: In some cases, the user may want to indicate that one field must be less than, greater than, greater than or equal to, or less than or equal to another field by choosing the corresponding option. For example, if measurement_A always had to be greater than measurement_B, the user would use ">" to express this relation.
To establish relations between fields with different data types: choose the Adv option, then enter a relation expression in the dialog box that appears. The valid format and content for this expression depends on what database is being used.
Click Add Relation. The top of the panel now displays a new relation.
When all desired relations are added, click OK to apply the relations and exit this panel.
To modify an existing relation:
Open the appropriate Relations window (see above procedure).
In the Relations list, click the relation definition to be modified.
Modify the relations.
Click Modify Relation.
To delete an existing relation:
Open the appropriate Relations window (see above procedure).
In the relation list, click the relation definition to be deleted.
Click Delete Relation.

Figure 13O:
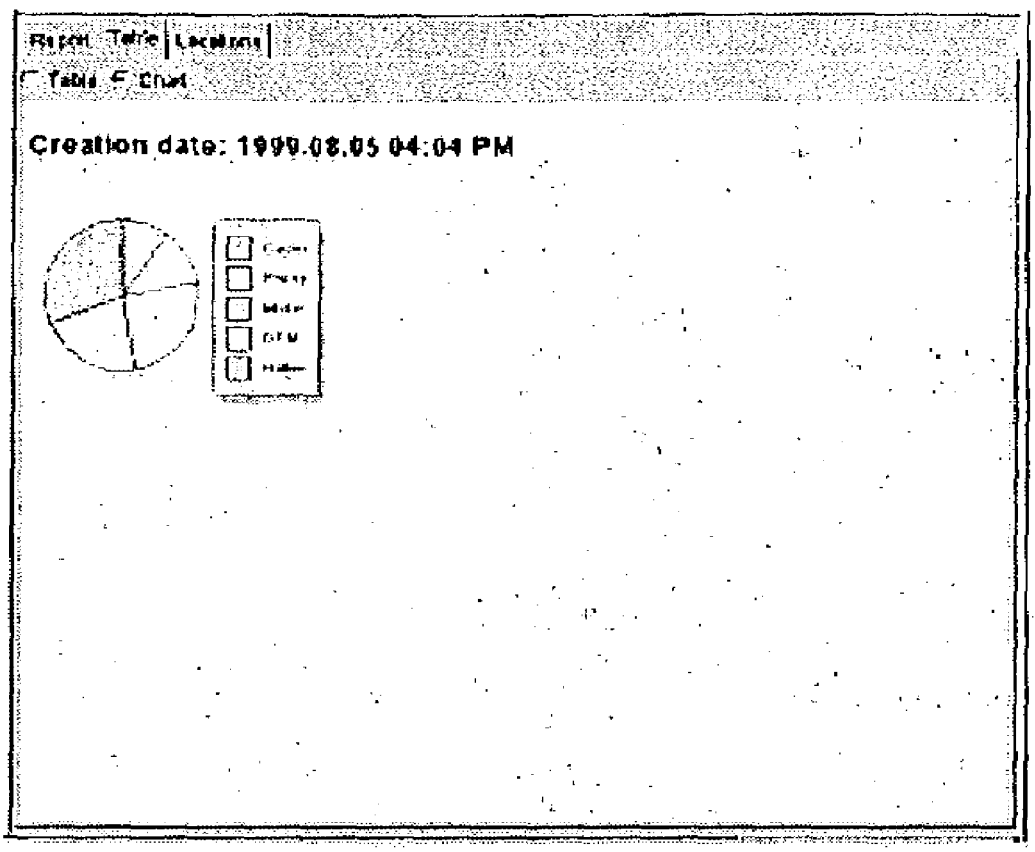

Typically, the first step in creating a dynamic or static report for a Web site is creating the report(s) to be included in a report template (i.e., the blueprint for the production of static or dynamic reports). Reports may be created as soon as one or more data sources are added to the tool. After the user has created a report, the report can be used to create a report template. If a data source has not yet been added to the tool and the relations are not determined, the user needs to so before creating reports. In one embodiment, the basic steps involved in creating a report are:

Adding report columns by dragging fields from the Data Source tree to the Report panel.
(Optional) Changing a report column's properties. For example, modifying the heading, determining sorting, including a subtotal or total, determining the type of value reported, or modifying the column's appearance by modifying properties available in the associated column box's Properties panel, as shown in FIG. 13B.
(Optional) Adding conditions to the report using the Simple Conditions Editor (shown in FIG. 13M) and/or Advanced Conditions Editor., as shown in FIG. 13C.
(Optional) Previewing a limited version of report by clicking the Report panel's Table tab, shown in FIG. 13O.
(Optional) Making any necessary modifications.
(Optional) Previewing the complete report by right-clicking the Report tab panel choosing Preview from the shortcut menu.
(Optional) Making any necessary modifications.
Saving the report as a report file (so it can be added to a report template) by dragging the unused area of the Report tab to the Repository Tree's Report Files node (or by right-clicking the unused area of the Report tab, then choosing Reports> Save or Reports> Save As).

Figures 7A, 7B:
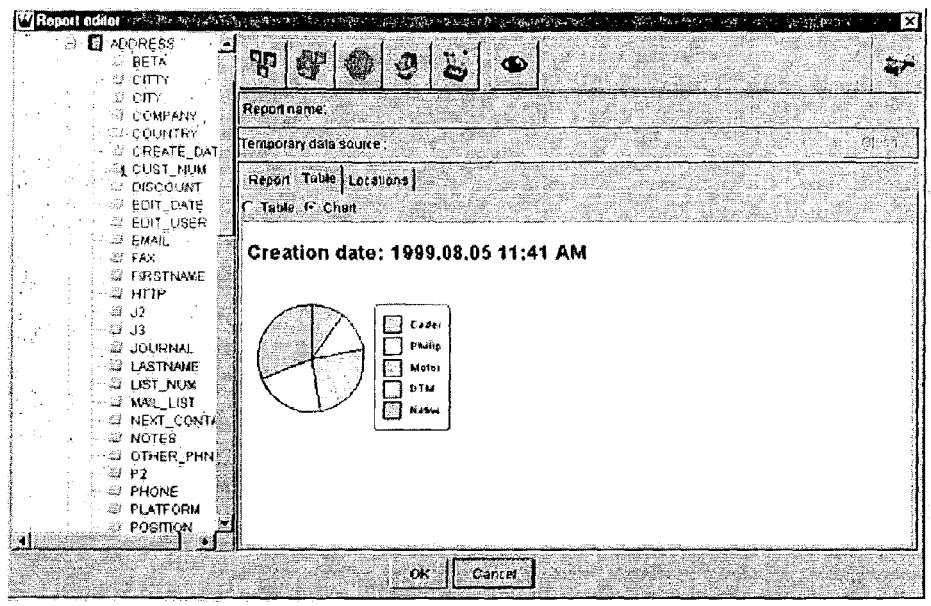
FIGS. 7A–7B are a report editor and the respective buttons according to one embodiment of the present invention.
Figure 8A:
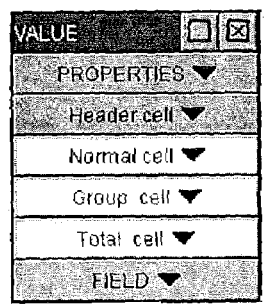
FIGS. 8A–8D are exemplary tabs for adding and removing columns according to one embodiment of the present invention.

FIGS. 7A and 7B are exemplary UIs for a report editor. The Report Editor allows modification and/or creation of reports to be represented in a report template. The Report Editor works similar to the Report panel, but includes several additional toolbar buttons to assist the user in creating reports. Buttons available in the toolbar are shown in FIG. 7B and include:

New: Creates a new report.
Save: Saves the current report as a report file.
Stop: Stops the current Report Editor process.
Refresh: Refreshes the report.
Settings: allows changing Report panel settings.
Preview: Displays the report in the default web browser.
Each report created in the tool is a collection of report columns. The report columns are based on the data source's fields; each report column's properties and conditions are modified until they indicate the precise information to be included in the column. To add report columns:
In the Data Source tree, locate one of the fields to be included include in the report, and drag it into the Report tab. A column box that represents a report column will open in the Report tab, as shown in FIG. 8A.
Continue dragging fields into the Report tab until all necessary fields appear (as column boxes) in the Report tab.

Figure 8B:
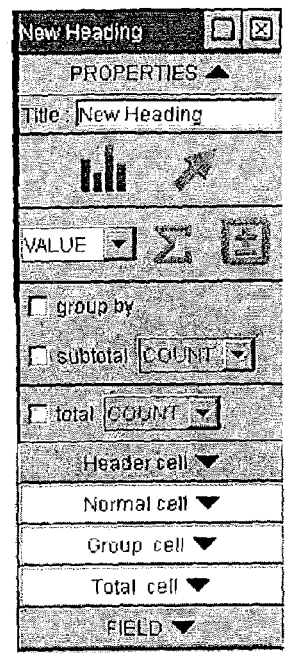

To remove a column from the report, click the Remove button in the upper-right corner of the column box to be removed. To view the properties of the field a report column is based on, expand the Field section at the bottom of the column box. The box shown in FIG. 8B appears. The arrangement of the report's columns can be changed by rearranging the column boxes. To move a column box, drag it to the desired position. To change the text in a report's column header, expand the associated column box's Properties panel, type the new title in the Title field 81, then press the Enter key. When the report is generated, it will contain the modified column name; the column box will adopt this new title immediately.

If the user wants to use a field's records only as report conditions (for example, to use the date field to determine the report's date range, but does not want records for the date field included in the report), the user can make that field's report column invisible. To make a report column invisible:

Click the column box's button 80 in the column's box's upper right corner. Button 80 in the top of the column box will turn to a flat line. This indicates that the column will not appear in the report.

If it is desired to have the report sorted by the values stored in one or more of the columns, click the Sort button 82 in the Properties panel of the selected column(s). After this button is clicked, it will change to a button with a different shape. This designates that the report will be sorted by values in this report column. If it is desired to sort the report by multiple columns, the user should first enable sorting of the columns according to their respective sort priority. A column's sort priority is indicated by the number between the sort and sort type buttons. To change sort priority, click the arrow buttons to the right and left of the column's sort priority number.

If a column is designated as sorted, the user needs to indicate what type of sorting is desired. This can be done by clicking the arrow icon to the right of the sorted button until it expresses the type of desired sorting. The up arrow button 84 indicates ascending sorting and a down arrow indicates descending sorting. The user can only change sort type in columns that are designated as sorted. If the user does not want the report sorted, do not click the sort button 82 in any column boxes. The sort button 82 designates that the column is not sorted. To toggle between sorted and unsorted, click the sort/unsort button. To change a sorted column back to an unsorted column, simply click sort button 82.

The user can determine what kind of information to be displayed in each report column. A report column can contain an actual value, or display the result of an operation (such as calculating a sum, maximum value, or minimum value). All of these operations (except displaying actual values) are performed for all rows that have identical values in all columns except the column that the operation is being performed on. To determine the type of information displayed in a report column:

Expand the Properties panel of the column box whose value type to be determined.

Indicate what type of value to be displayed by choosing one of the following items from the Value Type box:

VALUE: displays the actual values contained in the associated field.

SUM: displays the sum of values from the auto-grouped rows. This can also be chosen by clicking the Sum button 86.

MIN: displays the minimum value from the auto-grouped rows.

MAX: displays the maximum value from the auto-grouped rows.

AVG: displays the average value from the auto-grouped rows.

COUNT: displays the number of auto-grouped rows. This is useful for counting the number of different records in a column (count only counts the number of different entries).

Figure 8C:
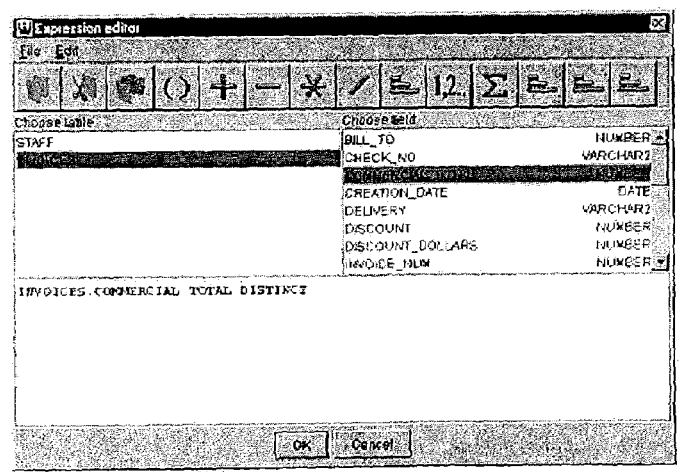

OTHER: displays information defined by a user-defined expression (to add/edit an expression, click the Expressions Editor button 88). This opens the expressions editor shown in FIG. 8C, where the user can enter the desired expression by entering any valid SQL sequence. Parts of the SQL sentence can be added by clicking tool bar buttons and/or typing them in by hand. Placing the cursor over a tool bar button will open a window with the button's name.

To include a column's subtotal in the report:

Expand the Properties panel of the column box for which a subtotal is desired.

Check the Subtotal check box.

Indicate what type of subtotal the report to contain by choosing one of the following options from the Subtotal Type box: SUM, MIN, MAX, AVG, OR COUNT.

If the report is configured to display one or more subtotals, an additional row will be placed below the grouped records in the executed report. For example, if the user wants to create a report with employees' monthly salaries, he might want to create a report containing the following columns: First name, Last name, and Monthly salary.

To calculate the subtotals of each employees' monthly salaries, the user would check the Subtotal check box in the Salary column box, then choose SUM from the Subtotal Type box.

If a user wants to calculate subtotals when some of the columns can be used as row grouping columns, the user need to indicate how she wants the columns grouped. To indicate grouping preferences, check the Group By check box in the column(s) to be "grouping" in subtotal calculations. In columns indicated as "grouping," all rows containing the same values will be packed into one group. Subtotals will be calculated separately in all columns where a subtotal calculation was requested for. For example, using the same premise as the above example, a user has a report of employees' monthly salaries that contains the following columns: First name, Last name, and Salary.

In this case, First Name and Last Name should be the grouping columns. When the Group By check boxes in these two column boxes have been checked, the executed report displays rows grouped in sections containing all monthly salaries for one employee, with the sum of the employee's monthly salaries below.

The tool can also include several types of totals in the reports. While subtotals are calculated using only grouped rows, totals are calculated using all rows. Totals are displayed in a row that is added to the end of the report. To include a column's totals in a report:

Expand the Properties panel of a column box.

Check the Total check box.

Indicate what type of total the report to contain by choosing one of the total types from the Total Type box.

Figure 8D:
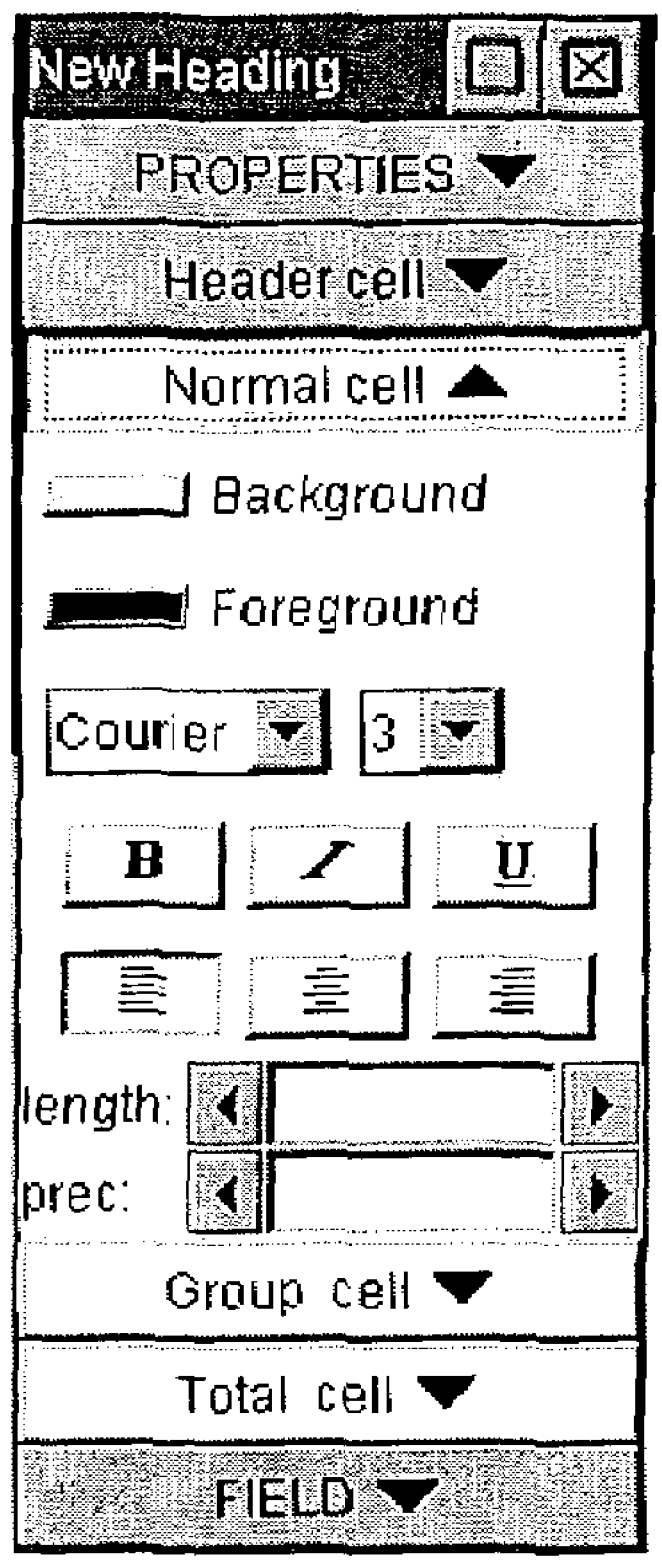

The software tool of the present invention provides the capability of customizing each of the report columns' appearance by selecting options in the associated column boxes. To change the appearance of a particular report column:

Expand the section of the column box that corresponds to the type of cell whose appearance to be changed. The box of FIG. 8D appears.

Customize the report column by modifying the options to be changed. Available options include:

Background cell color (select a color by choosing a swatch, choosing hue, saturation, and brightness values, or choosing RGB values).

Foreground cell color/text color (select a color by choosing a swatch, choosing hue, saturation, and brightness values, or choosing RGB values).

Font (select Arial, Times, or Courier).

Font size (select a number between 1 and 7).

Font style (choose from Bold, Italic, and Underlined).

Text alignment (choose from right justified, left justified, or centered).

Length: Number of characters.

Precision: Number of digits displayed to the right of the decimal point.

To change the default value assigned to all report columns, modify the options in the Table tab of the Report Panel Options panel.

The information about the field associated with a report column can beviewed by expanding the Field portion of the column's column box. This opens a panel that displays the following properties:

Status: Indicates whether or not this field is currently in the data source. Exemplary statuses are OK (field exists in the data source) and NOT IN DATA SOURCE (field is not in data source). If a field is not in the data source, the user needs to either update the data source or remove this report column.

Data Source: The name of the data source that contains the field associated with this table.

Schema: The name of the schema the field associated with this table belongs to.

Table: The name of the table that the field associated with this column belongs to.

Field: The name of the field associated with this column.

Conditions allow the users to restrict the type of records that appear in their reports. By entering conditions, the users can ensure that their reports contains precisely the information they want to see, and no extraneous information. There are two ways to enter conditions in this embodiment of the tool:

Use the Simple Condition Editor to enter a simple condition (such as a date range, or an expression that filters out records from a field that do or not contain a specified string).

Use the Condition Editor to compose complex conditions.

The preferred method to use depends on the nature of the query. If a field needs to be limited to records for which a single simple condition (for example, a date range, a value range, a certain string, etc.) is true or is not true, it is preferred to use the Simple Condition Editor. If the user wants to enter more complex queries, (such as those that use conditions that involve more than one field, or those that contain context-sensitive conditions), she needs to use the Condition Editor. In this embodiment, the user can use the Condition Editor to enter basic conditions, but she cannot use the Simple Condition Editor to enter complex conditions. The Simple Condition editor accepts any allowed SQL queries that refers only to a single field; the Condition Editor can accepts any allowed SQL query. The Simple Condition Editor provides an easy way to enter conditions. In this panel, the user can specify the value that she wants a report column to contain or not contain, or, the user can precede a value with <=,>, or >=to indicate that she want the values displayed to be something other than equal to (or not equal to) the condition entered. To enter a simple condition:

Right-click anywhere in the Report tab. A shortcut menu will open.

Figure 9A:
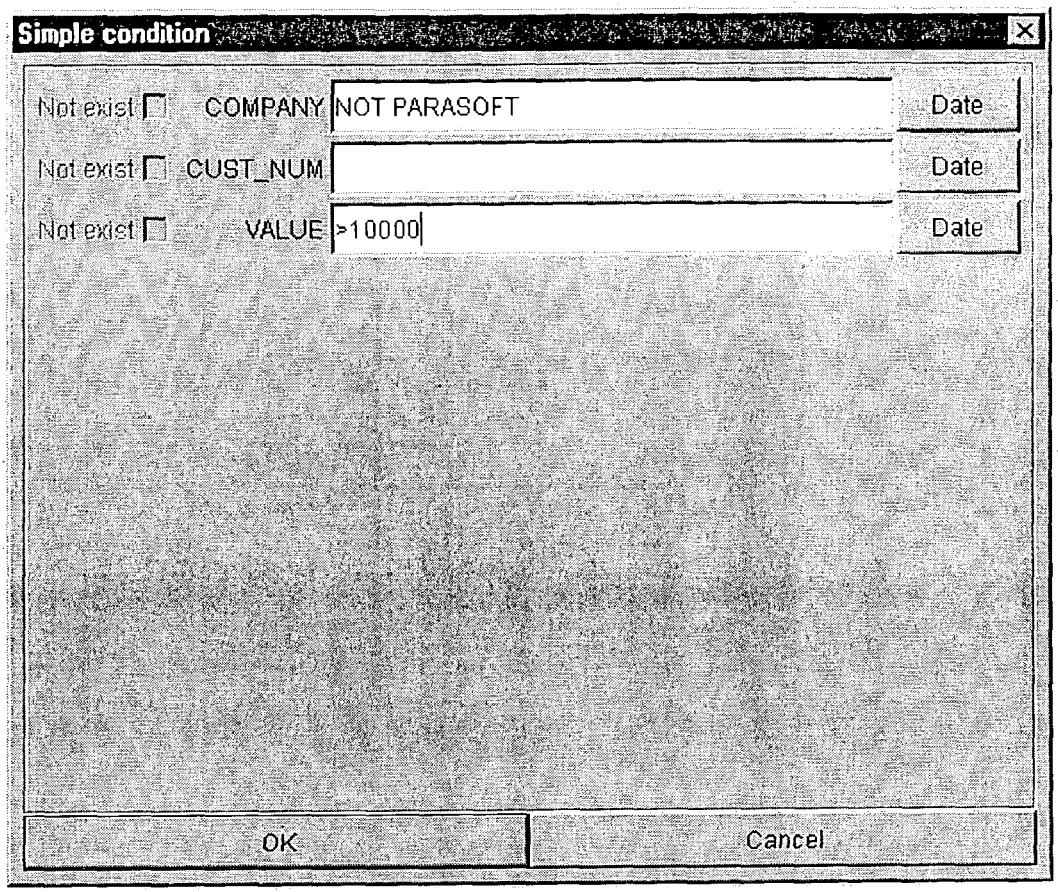
FIGS. 9A–9C are exemplary screens for using and modifying conditions and displaying information according to one embodiment of the present invention.

Choose Simple Condition from the shortcut menu. A Simple Condition Editor, shown in FIG. 9A will open. In this editor, each report column is represented by a check box and text field.

In the appropriate text field, enter the condition that must be true for this column's values. When a condition is entered, the actual value or a parameter (see below for more information on parameters) can be specified. The condition can be preceded by one of the following operators: =, <, ><, <=, >=or < >. If no operator is specified, =is used. NOT, AND, or OR may also be used within a condition for a field.

Enter conditions for additional fields, if needed.

Click OK to apply the conditions and exit the Simple Condition dialog box.

The tool is capable of asking about the condition's parameters at report execution time if the user uses parameters in the condition. To have a report ask the user to input the parameters that place a condition on the report, enter a parameter name, preceded by "$P", in the appropriate text field. For example, entering ">$Pdate" asks the user for a "date" parameter when the report is being executed, then displays only records that contain a date later than the date specified. All parameters begin with $P; the second component can be any string.

Any conditions created in the Simple Condition Editor can be modified in the Simple Condition Editor. Conditions created in the Condition Editor can only be modified in the Condition Editor. To modify a condition, make the necessary changes in the Simple Condition Editor's text field(s) and check boxes, then click OK. The Condition Editor allows the user add conditions that are more complex than the Simple Condition Editor allows. The Condition Editor allows entering any legal SQL query, so there are virtually no limits to the type of conditions that can be placed on the reports. To enter a condition in the Condition Editor:

Right-click anywhere in the Report tab. A shortcut menu will open.

Figure 9B:
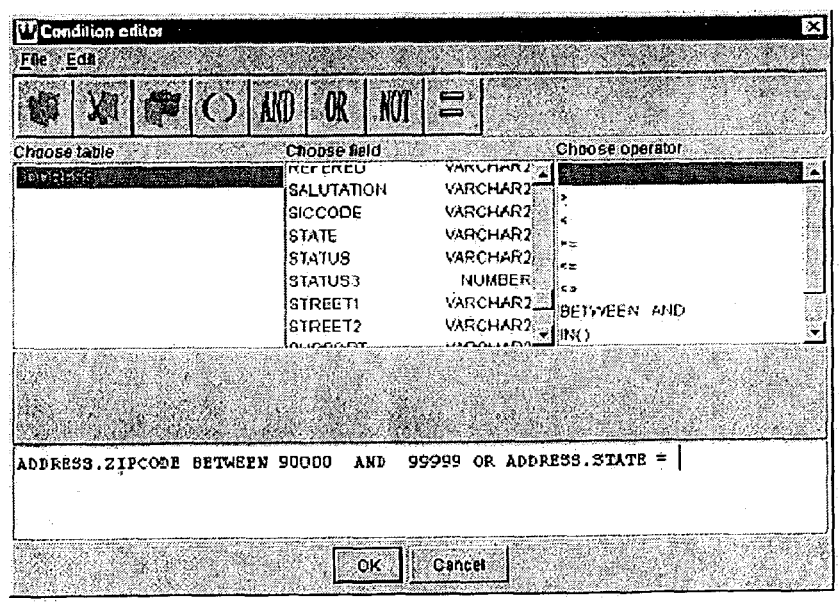

Choose Advanced Condition from the shortcut menu. The Conditions Editor window, as shown in FIG. 9B will open. All tables are listed in the table column. When a table is selected, the field column displays that column's fields. Any simple conditions that have been entered are displayed in the middle of the Condition Editor, but cannot be edited in this Editor.

Compose the condition by entering it directly in the lower pane, or by adding elements from the GUI toolbar and columns. As elements from the GUI are added, they are displayed (in SQL) in the lower pane of the conditions editor.

To enter a field into the condition statement, double-click the appropriate field in the Field column.

To enter an operator or other element, double-click the operator in the Operator column, or double-click a tool bar button.

To save the condition and close the Condition Editor, choose File> Close.

As described above, parameters can also be used here to have the tool ask about the condition's parameter at report execution time. At its basic level, creating reports involves creating report columns based on fields from the related data source. This is done by simply dragging fields into the Report panel. Complexity and format can be added to reports by such means as changing value types, adding totals and subtotals, sorting the report, adding conditions, and more.

In one embodiment, reports can be created in two main formats: table and chart. Charts can be used if one or more columns in the report contains numerical data. However, any report can be displayed in table format. By default, reports are generated as tables. If a user wants his report to be formatted as a chart, he can do so by clicking the Table tab in the Report panel, then click the Chart button. To change a report's format from chart to table, click the Table tab in the Report panel, then click the Table button. Both report formats are highly customizable. Table properties can be modified at any time. Chart properties can be modified only when the user indicates that the current report should be formatted as a chart.

If there are multiple data sources that share a common structure (for example, if there is a different but similar data source for each office location), locations features can be used to automatically generate different version of the same type of report for each similar data source or location. Using the locations feature, the user can create a report template once, then have the tool automatically generate a version of that report for each of the data sources designated as locations. This relieves the user from having to create and execute the same report for all locations. This feature could be used, for example, if there are multiple office locations who store data in the same way, but in different data sources, and the user wants to create a separate (but similar) report for each location.

The first time users use the locations feature to create multiple version of a report, they need to configure locations, create one report, then indicate what locations they want the report generated for. All subsequent times that the users want to use the locations feature to create multiple versions of a report, they simply create one report, then indicate what locations they want a report generated for.

If the data source(s) to be used as "locations" are not currently in the data source tree, add any data source(s) to be used.

Define locations.
a. Right-click anywhere in the data source tree. A shortcut menu will open.
b. Choose Locations from the shortcut menu. The Locations window will open.
c. In the Locations window, click the Add button. The Edit Location window opens.
d. From the list of available data sources in the Edit Location window, select a data source that to be designate das a location, then click Add to add it to the Chosen Data Sources list.
e. In the location name field, enter a name for this location.
f. If the new location need to use schemas, check the Use Schema check box.
g. Click OK.
h. Add any additional locations by repeating steps c–g above.
i. When done adding locations, click OK in the Locations window.

To indicate what location to generate a report for:
Create the report.
Click the Locations tab (shown in FIG. 13H) in the Report panel.
In the Locations tab, check the check boxes associated with the report locations.
Save the report.

Users can preview either a full or limited version of any report. Previewed reports let the users see how a report will look when executed and viewed on an HTML browser. To preview the first few rows of a report and check if any errors are reported upon execution, click the Table tab in the Report panel. By default, a table will display a version of the report that contains only few rows (the number of rows displayed can be changed). This report will be generated almost instantly. To have the tool look at the data source and re-execute the preview report with the latest data available, right-click the "unused" area of the Report panel then choose Refresh from the shortcut menu.

To view a complete version of a report, right-click the unused area of the Reports tab, then choose Preview from the shortcut menu that opens. The tool will generate the report, then display it in a web browser. To have the tool look at the data source and re-execute the preview report with the latest data available, right-click the node associated with this report in the Repository tree's Reports node, then choose Refresh and View from the shortcut menu.

In order to use a report in a report template, or to view and/or modify a report at a later date, the report needs to be saved first. Typically, there are two ways to save a report:

Method 1: Drag the unused area of the Report tab to the Report Files node of the Repository tree.
Press the left mouse button when the cursor is in the "unused area" of the Report tab.
While still pressing the mouse button, move the cursor to the Repository tree (on the bottom left side of the screen).
Release the left mouse button when the cursor is over the destination repository folder (this is called Report Files by default).

Method 2: Right-click the unused area of the Report tab, then choose Reports> Save or Reports> Save As.
Right-click the "unused area" of the Report tab. A shortcut menu will open.
From the shortcut menu, choose Reports> Save or Reports> Save As. The Save or Save As dialog box will open.
In the dialog box, type or select the desired filename and path.
Click OK.

If an existing report needs to be modified, the appropriate report file should be opened in the Report tab. There are two ways to open a report file:

Method 1: Choosing Reports> Load
Right-click the unused area of the Report tab. A shortcut menu will open.
From the shortcut menu, choose Reports> Load. A file browser dialog box will open.
In the file browser, choose the report file to be opened, then click OK.

Method 2: Drag the report file to the Report tab.
If the report is stored in the Repository tree, it can be dragged from this tree to the Report tab. This tree contains four folders, each of which store a different type of file (HTML files, HTML templates, image files, report files). To open a report by dragging it from the Repository tree:
Open the branch of the Repository tree that contains the report files.
Drag the report file to be modified into "unused area" of the Report tab.

After a report is opened in the Reports tab, it can be modified. At this point, the user can perform any available report-related operations, including adding and removing report columns, changing report properties, entering conditions, and more.

To ensure that a static report contains the most current database information, the user can refresh the report so that it is based on the most current data available in the database. To refresh a report:
In the Reports node of the Repository tree, right-click the node associated with the report to be refreshed. A shortcut menu will open.
Choose Refresh and View from the shortcut menu.

To change what data source a report is based on (for example, if a primary data source is replaced with a new data source), the data source needs to be updated. To generate the same report for different data sources, the user should use the locations feature rather than updating the data source. To change the data source that a report is using:

Right-click the unused area of the Reports panel. A shortcut menu will open.

From the shortcut menu, choose Update Data Sources. The Update Data Sources dialog box will open.

In the Update Data Sources dialog box, select the data source to be used by this report. The dialog box will then indicate how many fields from the original report are recognized in the new data source, as well as how many fields from the original report are not recognized in the new data source. If a relation between fields from the original and new data sources is not recognized, the user can later determine this relation manually.

Click OK to update the data source.

The user can determine what kind of information will be displayed in each report column. Report columns can contain an actual value, or display the result of an operation (such as calculating a sum, maximum value, or minimum value). In one embodiment, all of these operations (except displaying actual values) are performed for all rows that have identical values in all columns except the column that the operation is being performed on. To determine the type of information displayed in a report column:

Expand the Properties panel of the column box whose value type to be determined.

Figure 9C:
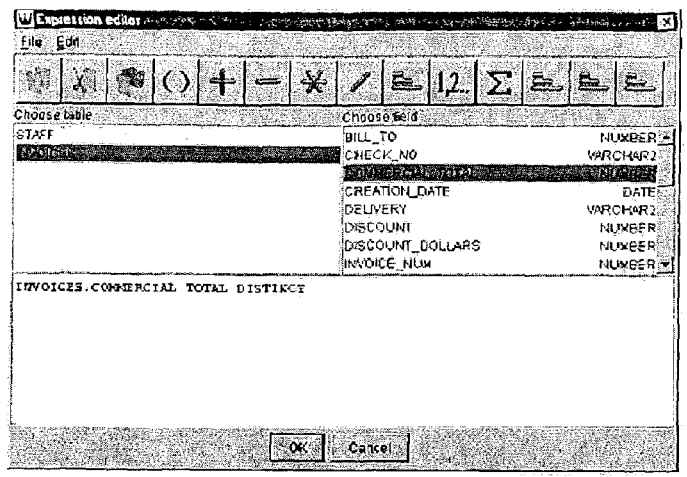

Indicate what type of value to be displayed by choosing one of the items from the Value Type box:

OTHER button displays information defined by a user-defined expression (to add/edit an expression, click the Expression Editor button. This opens the Expressions Editor, shown in FIG. 9C, where the user can enter the desired expression by entering any valid SQL sequence. Parts of the SQL sentence can be added by clicking toolbar buttons, choosing expressions from the Expressions menu, and/or typing them in by hand. Placing the cursor over a toolbar button will open a window with the button's name.

The Report panel makes it easy to create and view reports; the Visual Editor makes it easy to create a report template that allows publishing these reports on a Web site. The basic tasks involved in creating a form template are listed below.

Open the Visual Editor by clicking the Visual Editor button.

Select Form mode by selecting Forms in the Visual Editor's mode selector.

Build a database records viewer by adding and customizing available components.

Basic components to add include:
Four DBF buttons
One DBF input line

Add and customize page components.

Preview the page.

Save the page to create a report template.

Thus, creating a report template in the Visual Editor involves adding one or more reports and other components (such as text, images, and backgrounds) by double-clicking icons representing page components, then providing more details about the inserted component(s). The page is designed using these components, then is checked how it looks by using the preview function. As the user saves the page, the tool automatically creates a report template. When this report template is published to a site, it will produce a "live" report—a report that is always based on the information contained in the database at time of report access. The user doe not need to know, use, or even see HTML code to create a report template with the Visual Editor.

Before a report can be published to a web site, a report template that contains information on how to execute and present the report and how to present the report needs to be created. If the user does not want to place a report on a web site, the user does not need to create a report template. In one embodiment, there are three different ways to produce a report template:

1. automatically create a basic report template,
2. create a customized report template using the Visual Editor tool, and
3. manually create a report template outside of the tool.

The software tool of the present invention provides the capability of creating report files using HTML templates based on any page design that a user desires. Also, a template can be made out of any HTML page whose source can be edited. To create an HTML template:

In an editor which allows editing an HTML file's source code, open the HTML file to be used as a template.

Delete any undesirable content in all pages based on this template. For example, the user may want to remove headings, paragraphs, etc.

Determine where in the file to be inserted either the report (if the report is to be published) or report template contents (if the report template is being created with Visual Editor). In that location, enter <DATA_RECON> When the Visual Editor saves this file, it will replace the <DATA_RECON> tag with the report or Visual Editor report template information panel.

Save the file as a text-only file with a .html extension. Save this file in a subdirectory in the installation directory.

If the template uses images that are not already on the web site, save them in the /users/name/images subdirectory in the installation directory.

If the user is creating a report template with the Visual Editor, the user can base the report on an HTML template by adding a template to the Visual Editor page. If the user is going to have the tool automatically create a basic report template as he adds the report to the site tree, the use can indicate which template he wants the report to be based on when the user adds the report to site tree.

For the following conditions, the tool can automatically create a report template the report is being added to a site:

The use does not want to add report-specific components (such as text, buttons, etc.) to the final report page, and The user has created a report that does not use parameters the user wants to create a dynamic or static report, or The user has created a report that uses parameters and the user wants to create a static report.

When a basic report template is automatically created, the user does not need to use the Visual Editor to create a report template; she can add a report to the site tree immediately after it is created. When the report is added to the site, a report template is generated automatically and then the tool places instructions for executing the report into an HTML template of choice. This HTML template can be one of the basic templates provided by the tool, or a custom HTML template that has been added to the tool.

To create a report template outside of the tool:

Create the report in the Report panel.

Save the report as a template by right-clicking the unused area of the Report panel, choosing Reports> Save Template As from the shortcut menu, and specifying the file name and path for the template. This saves a template that contains the information needed to connect to the database and to create the report; unlike the rep file created in the Visual Editor, these rep files do not contain information about how to place the report in an HTML page.

To view a template before saving it, right-click the "unused area" of the Report tab, then choose Show Template from the shortcut menu. A dialog box displaying the report's template will open. To save this template as a .rep file, click the Save button.

In a HTML editor, open the .rep file and add HTML code to create a valid HTML page. The report will be placed where the template information is placed. When done adding to the file, save the file with a .rep extension and place it in the /users subdirectory in the installation directory.

If the template uses any images that are not already on the web site, save them in the /users/[name]fimages subdirectory in the installation directory.

Publish either a dynamic or static report based on this template.

The Report panel makes it easy to create and view reports; the Visual Editor makes it easy to create a report template that allows publishing these reports on a web site. The basic tasks involved in creating a report template are listed below.

Opening the Visual Editor by clicking the Visual Editor button in the tool bar.

Adding and customizing page components.

Previewing the page.

Saving the page to create a report template.

In general, creating a report template in the Visual Editor involves adding one or more reports and other components (such as text, images, and backgrounds) by double-clicking icons representing page components, then providing more details about the inserted component(s). The user designs the page using these components, then checks what the page produced by this template will look like using the preview function. As the user saves the page, the tool automatically creates a report template. When this report template is published to a site, it will produce a "live" report—a report that is always based on the information contained in the database at time of report access.

In one embodiment, all components to be included in a report template need to be added to the Visual Editor "canvas." FIG. 13A shows an exemplary canvas. Generally, concrete components (such as text, images, and buttons) are placed on the canvas when they are added, and more abstract components (such as properties and forms) are placed below the canvas. All components on or below the canvas are included in the report template. To add components to the Visual Editor canvas:

If the Visual Editor Canvas is not already open, open it by clicking the Visual Editor button in the tool bar.

Add components (such as the report, text, horizontal rules, buttons, etc.) to the report template by clicking toolbar buttons and modifying component properties. The following list includes components that may be added: a report, an image, text, a background, a horizontal rule, page properties, HTML code, an input line, a password field, a check box, a radio button, a list box, a combo box, an HTML template, an action button, and form data.

To modify a component's properties, click the representation of that component on or below the canvas, then edit the properties using the Editor Property tab shown in FIG. 13G.

To change a component's position on the page, drag it to the desired location. To resize a single component (such as an image or text box), drag a corner or side handle until the component is the appropriate size. To align multiple components:

Select the components to be aligned.

Right-click anywhere in the canvas. A shortcut menu will open.

Choose Align from the shortcut menu, then choose the command that corresponds to the appropriate alignment option.

To resize components for uniformity:

Select the components to be resized for uniformity.

Right-click anywhere in the canvas. A shortcut menu will open.

Choose Sizes from the shortcut menu, then choose the command that corresponds to the desired resize. For example, to select all components to have the same height as the tallest selected component, choose Same Height (max), and to have all the selected components to be spaced evenly on the Y-axis, choose Equal Vertical Spacing.

To remove one or more components:

Select the component(s) to be removed.

Right-click anywhere in the canvas. A shortcut menu will open.

Choose Edit> Delete from the shortcut menu.

To change canvas properties, click the Editor Properties button in the bottom right corner of the canvas, then modify available options. To change the measurement scheme used in the canvas' rulers, click the ruler button next to the ruler.

Users can add any report that they have saved as a .wrp file to their report template, or they can add a generic report, then use the Report Editor to create a new report. To include a report in the report template, either of the following procedures may be performed. The first procedure is faster, but can only be used when the user has an existing report to add to the report template.

To add a report to a report template:

Drag the report to be added from the Report files branch of the Repository tree to the Visual Editor canvas. The selected report will be represented on the canvas and included in the report template.

(Optional) Customize the report by modifying options in the Visual Editor Property tab. Available options include:

POS X. Specifies the report's position on the x-axis.

POS Y: Specifies the report's position on the y-axis.

Width: Specifies the width of the report.

Height: Specifies the height of the report.

Import: Lets the user specify what report is added, and opens this report in the Report Editor.

Edit: Opens the selected report in the Report Editor, which allows the user to modify the report's contents and format.

Add Params: Allows for adding parameters to a report that passes parameters.

Table: Displays the report as a table.

Chart: Displays the report as a chart.

Reports (including generic representations of reports that have not yet been created) can also be added by performing the following procedure:

Click the Add Report icon. A box representing a report will be placed on the canvas.

Specify what report this box to represent (or click Edit to create a new report in the Report Editor). To specify what report to add:

Click Import in the Editor Properties tab. The Load Report dialog box will open.

In this dialog box, choose the .wrp file associated with the report to be added.

Figure 10:
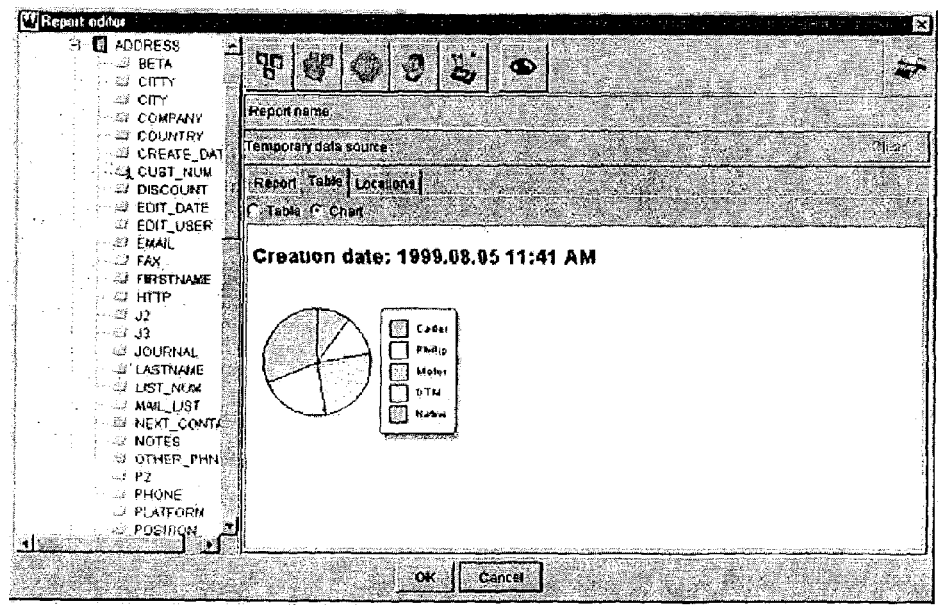
FIG. 10 is an exemplary report editor according to one embodiment of the present invention.

Click Open. The Report Editor will open and display the report, as shown in FIG. 10. To modify the report before placing it in a web page the user may use this editor.

To add the report to the page, click OK in the Report Editor. The report displayed in the Report Editor will be represented on the canvas and included in the report template.

(Optional) Customize the report by modifying options in the Visual Editor Property tab.

When a report is added, the Visual Editor will automatically add a reload button to the report template. In addition, if the report takes parameters, the tool adds an input line to the report file. Both of these items are automatically configured to perform the appropriate action; modification is optional. Either of these items may be removed by selecting the item to be removed, then pressing the Delete key.

To include an image (such as company logo) on the report template, either of the following procedures is performed. The first procedure is faster, but can only be used if the image file to be added is stored in the Repository tree.

Drag the image to be added from the Repository tree to the Visual Editor canvas.

(Optional) Customize the image by modifying options in the Editor Property tab.

To add images that are not stored in the Repository tree:

Click the Image icon. A box representing an image will be placed on the canvas.

Use the Editor Property tab to specify what image to be added.

Click the Browse button in the Editor Property tab. A Load Image dialog box will open.

In this dialog box, choose the image file to be added. Click Open.

(Optional) Customize the image by modifying options in the Editor Property tab.

To add an input line to the report template:

Click the Input icon. An input line will be placed on the canvas.

Specify what field this input line should be associated with.

Drag the field from the Data Source tree to the input line that appears on the Visual Editor canvas.

Specify the text to appear in the input line. (For example, "Enter a SQL query here"). If the input line to be empty, leave this field empty.

Specify what type of input to be accepted:

Column: The text entered in the input line names a database column.

Value: The text entered in the input line names a record value.

SQL: The text entered in the input line is an SQL query.

Specify a field type.

Normal: A Normal HTML input fields is an input field that the user can see and edit). The value that the user enters in this field is included in the submitted form's parameter list.

Hidden: A Hidden input field is not visible to the user. It is used to embed information into forms. A hidden input field's name and value (as specified in the default value field) is automatically included in the submitted form's parameter list.

Read-only: A read-only input field's value is visible to the user, but users cannot modify the field's value. Like a hidden input field, it is used to embed information into forms, and its name and value (as specified in the default value field) are automatically included in the submitted form's parameter list.

(Optional) Customize the input line by modifying options in the Editor Property tab. Available options include:

Field size: Specifies the maximum number of characters that the user can enter in this input line. The default value used is determined by examining the field associated with this password line.

Add/Search Validator Tabs: Allows the user to restrict what type of input is valid for add and search actions. The Add tab determines restrictions for add actions; the Search tab determines restrictions for search actions (for example, clicking a First, Previous, Next, or Last button). Check the options that correspond to the input characteristics to be required.

Is number: Requires that the value entered is a number.

Not empty: Requires that some type of value is entered; does not allow the input field to be left empty.

Picture: Requires that the value entered is in a format specified in the field to the right of the check box. For example, a user can be required to enter a value whose format is like "43-ebs" by checking the Picture check box, then entering "##-@ @ @" in the field to the right of the checkbox. # is used to represent a single number and @ is used to represent a single character.

Range: Requires that the value entered falls within a range specified in the fields to the right of the check box. For example, a user could be required to enter a value between 1 and 10 by checking the Range check box, then entering "1" in the first field to the right of the check box, and "10" in the next field to the right.

Edit messages: Determines what messages are displayed when a user enters a value that does not meet specified restrictions. To edit a message, click the Edit Message button, enter the desired message in the appropriate field of the panel that appears, then click OK.

To add text to the report template:

Click the Add Text icon. An empty box will be placed on the canvas. This box represents a block of text; the block itself will not appear on the actual report template.

In the Editor Property tab, click Edit. A text editor will open.

In the text editor, enter and format the text. Enter text by typing it in the dialog box.

Format text by selecting the text to be formatted, and clicking a tool bar button. To create a hypertext link, select the text be to used as hypertext, click the Hyperlink toolbar button, enter the URL that the hyperlink should link to in the dialog box that opens, then click OK.

(Optional) Customize the text by modifying options in the Editor Property tab. Two types of text may be added to reports:

1. Text that will always appear exactly as it was entered (static text)
2. Variables to represent types of text that the user wants to appear, and let the tool add the text that corresponds to these values at the time the report is generated (dynamic text). For example, a variable could be used to represent the row number of the record currently being modified). To add either type of text to a form template:

Click the Add Text icon. An empty box will be placed on the canvas. This box represents a block of text; the block itself will not appear on the actual report template.

In the Editor Property tab, click Edit. A text editor will open.

In the text editor, enter and format any text to appear on the form. Enter text by typing it in the dialog box. Format text by selecting the text to be formatted, and clicking a toolbar button. If it is desired to add a variable to the text, choose the variable to be added from the variable box at the top right side of the text editor. When the form is executed, the value that the variable represents will be substituted for the variable name. Available variables include:

cgi params: Displays the cgi parameters drivers: Displays the driver used to connect to the database maximum row number: Displays the total number of rows in the field password: Displays the password used to connect to the database relations: Displays the relations row number: Displays the current record's row number select sql status: displays the latest operation status message url: displays the url used to connect to the database user: displays the username used to connect to the database.

As an example, if the user wants to display information about what record was currently displayed and how many other rows were in the field, the user could enter the following combination of static text and variables: This record is row $ROW_NUMBER of $MAX_ROW_NUMBER. When the page is executed, users would see something like "This record is row 3 of 100." To create a hypertext link, select the text to be used as hypertext, click the Hyperlink toolbar button, enter the URL that the hyperlink should link to in the dialog box that opens, then click OK (Optional) Customize the text by modifying options in the Editor Property tab.

To add a DBF text area to the form template:

Click the DBF icon. A text area will be placed on the canvas.

Specify what field this text area should be associated with. Drag the field from the Data Source tree to the text area that appears on the Visual Editor canvas.

(Optional) Customize the text area by modifying options in the Editor Property tab. Available options include: Field size and Add/Search Validator tabs, described above.

To add a background color or image file to the report template:

Click the Background icon. A box representing a background will be placed below the canvas.

Use the Editor Property tab to specify what background to be added. Image files or colors may be selected as the background.

To add a horizontal rule to the report template:

Click the Horizontal Rule icon. A horizontal rule will be placed on the canvas.

(Optional) Customize the horizontal rule by modifying options in the Editor Property tab.

To add properties such as a custom title and meta tags to the report template:

Click the icon. An empty box will be placed on the canvas.

Use the Editor Property tab to enter any properties to be included in the page. Available options include:

Title: Specifies the content of the page's <TITLE> tag.

Author: Specifies the page's author.

Description: Contains a description of the page's contents.

Keywords: Defines a set of keywords that search engines may use to classify a page.

META Data: Contains the custom meta tag generated by the name and content fields.

Name: In combination with the Content field, allows creating a custom meta tag. Specifies the NAME value to be included in the custom meta tag.

Content: In combination with the Name field, allows creating a custom meta tag. Specifies the CONTENT value to be included in the custom meta tag.

To add an HTML component that is not represented by one of the available buttons (for example, a heading), add an HTML code block to the canvas, and enter the HTML code that corresponds to the component to be added. The HTML code component allows entering any legal HTML code. To add HTML code:

Click the HTML icon. A box representing HTML code will be placed on the canvas.

Click the Edit button in the Editor Property tab to open a window in which the HTML code can be added.

(Optional) Customize the added component by modifying options in the Editor Property tab.

To add an input line to the report template:

Click the Input Line icon. An input line will be placed on the canvas.

Use the Editor Property tab to specify the input line's properties.

(Optional) Customize the input line by modifying options in the Editor Property tab.

A password field operates the same as an input line, but while the text the user enters in an input line is displayed on the screen, the text the user enters in a password field is masked with asterisked on the screen. To add a password field:

Click the Password Field icon. A password field will be placed on the canvas.

In the Name field, enter the name of the parameter to be determineed (for example, $Pdate).

In the Password field, enter the default value to be entered in this password field. This default value will be masked with asterisks.

To add a DBF password line to the form template:

Click the Password icon. An password line will be placed on the canvas.

Specify what field this password line should be associated with.

(Optional) Customize the input line by modifying options in the Editor Property tab. Available options include:

Field size: Specifies the maximum number of characters that the user can enter in this input line. The default value used is determined by examining the field associated with this password line.

Add/Search Validator Tabs: Allows the user to restrict what type of input is valid for add and search actions. The Add tab determines restrictions for add actions; the Search tab determines restrictions for search actions (for example, clicking a First, Previous, Next, or Last button). Check the options that correspond to the input characteristics to be d.

Is number: Requires that the value entered is a number.
Not empty: Requires that some type of value is entered; does not allow the input field to be left empty.
Picture: Requires that the value entered is in a format specified in the field to the right of the check box.
Range: Requires that the value entered falls within a range specified in the fields to the right of the check box.
Edit messages: Determines what messages are displayed when a user enters a value that does not meet specified restrictions. To edit a message, click the Edit Message button, enter the desired message in the appropriate field of the panel that appears, then click OK.

If a report asks for parameters, the tool user may want to allow the end users (users of the report) to select a one of several predetermined parameter values using a list box. To add an list box to the report template:

Click the List icon. A list box will be placed on the canvas.
Use the Editor Property tab to specify the list box's properties.
   In the Name field above the text box, enter the name of the parameter to be specified by this list box.
   In the Name field below the text box, enter the name of one of the items to appear in the list box.
   In the Value field, enter the parameter value to be passed to the report when the value specified in the name field is selected.
Click Add to add this item to the bottom of the list, or click Insert to add this item above the item selected in the text box.
(Optional) Customize the list box by modifying options in the Editor Property tab.

To add a list box to a report template:
Click the List Box icon. A list box will be placed on the canvas.
Specify what field this list box should be associated with.
Use the Editor Property tab to specify the list box's properties.
   In the label field, enter the name of one of the items to appear in the list box.
   In the value field, enter the parameter value to be passed to the report when the value specified in the label field is selected.
Click Add to add this item to the bottom of the list, or click Insert to add this item above the item selected in the text box.
(Optional) Customize the input line by modifying options in the Editor Property tab.

If a report asks for parameters, the tool user may want to allow the end users to select a one of several predetermined parameter values using a combo box. To add an combo box to the report template:

Click the Combo Box icon. A combo box will be placed on the canvas.
Use the Editor Property tab to specify the combo box's properties.
(Optional) Customize the combo box by modifying options in the Editor Property tab.

The tool also provide Check boxes. Check boxes let the end users select options that the tool user provides. To add a check box to a report template:

Click the Check Box icon. A check box will be placed on the canvas.
In the Name field, enter the name of the parameter to be determined by the value entered in this input line (for example, $Pdate).
In the Value field, specify what value to be entered in the submitted form's parameter list when this box is selected.
If this box to be selected by default, enable the Checked option.

The tool provides the capability to include radio buttons in the report templates. Radio buttons let the end users select one of the options that the tool user provides. To add a radio button to the template:

Click the Radio Button icon. A radio button will be placed on the canvas.
In the Group field, enter the name of the parameter to be determined by the value entered in this input line (for example, $Pdate).
In the Value field, specify what value to be submitted to the submitted form's parameter list when this button is selected.
If this button to be selected by default, enable the Checked option.

To add an action button to the form template:
Click the Action icon. A button will be placed on the canvas.
Use the Editor Property tab to specify what type of button to be added.
   Add: Creates a button that adds data.
   Clear Form: Creates a button that clears the end user's form input.
   First: Creates a button that opens the first record.
   Previous: Creates a button that opens the previous record.
   Next: Creates a button that opens the next record.
   Last: Creates a button that opens the last record.
(Optional) Customize the button by modifying options in the Editor Property tab. Available options include:
   Confirm text: Enter any string to be displayed in a confirmation dialog box when the end user clicks this button. If this field does not contain a string, a dialog box will not appear when the end user clicks the button.
   Label: Specifies the text that appears on the button. By default, the label is the same as the button's action.
   Validateform data: When this option is enabled, the form checks if the values entered satisfy any restrictions the tool user sets for each input component. For example, if the user determined that the value of an input line must be a number, the tool checks if that value is indeed a number. If that value is not a number, the tool displays a warning message.
   POSITION buttons: Specifies the button's position.
   Name: Specifies what text appears on the button.
   Value: The name that will be added to the parameter list the browser sends to the server.

The tool is capable of allowing the user to add an HTML template to a page. Adding an HTML template to the page is an easy and efficient way to ensure that the report templates have the same "look" as other pages on the web site.

Click the HTML Template button in the Visual Editor. A box representing an HTML template will be placed below the canvas.
Use the Editor Property tab to specify what HTML template to be added.
   In the Editor Property tab, click Import. A dialog box will open.
   Choose the appropriate HTML template in the dialog box.

If the page already uses an HTML template and that template has been modified since the report template was created, the page can be updated to use the latest version of the HTML template. To update an HTML template, open the file containing the template in the Visual Editor, select its HTML template box below the canvas, then click the Refresh button.

If elements that allow end users to submit values (such as input lines, radio buttons, etc.) are added, the tool user needs to add form data in order to process the user's submission. To add form data to the report template:

Click the Add Form icon. A box representing form data will be placed below the canvas.

Use the Editor Property tab to specify the following form data properties:

Name: Assigns an identifier to the entire FORM element. An HTML page can contain multiple <FORM>s, so assigning each one a unique name helps to identify which one gets submitted.

Action: Indicates the URL of the application that is to receive and process the form's data.

Method: Determines how the browser sends the form's data to the server for processing.

Choose one of the following options:

Get: Contacts the form-processing server and sends the form data in a single transmission step; the browser appends the data to the form's action URL.

Post: The browser sends the data in two steps: first the browser contacts the form-processing server specified in the action attribute, and once contact is made, sends the data to the server in a separate transmission. It is usually best to use Get for small forms with a few short fields, and to use Post for longer forms, or forms with long fields.

If the results of the form is to be redirected to another window or frame, specify the window or frame in the Target field. If the form's data to be encrypted, check the Encrypt check box.

To add a DBFormer to the form template:

Click the Radio Button icon. A radio button will be placed on the canvas.

Specify what group this button to belong to.

Specify what value to be submitted to the submitted form's parameter list when this button is selected.

The dbformer's properties can be viewed in the Editor Properties tab by double-clicking the dbformer representation below the canvas. This tab displays the following information about the DBFormer:

Driver: Driver used to connect to the database.

URL: URL used to connect to the database.

User: Username used to connect to the database.

Password: Password used to connect to the database.

If there is a report template that has been previously saved as a .swf file, it can and modify it in the Visual Editor. To open an existing report template in the Visual Editor, drag it from the Repository tree's HTML files branch to the Visual Editor canvas. At any time while a user is working on a report template, she can see how the page will appear on a browser. To preview the page on a browser:

Right-click any area of the Visual Editor. A shortcut menu will open.

Choose Preview from the shortcut menu. The tool generates the page, then displays it in the web browser.

When a page created in the Visual Editor is saved, two files are created: a .swf file, used only by the Visual Editor, and a .rep file the tool runtime uses to connect to the required data source(s) and a "live" version of the specified report (a report based on the most recent data available in the data source(s)). There are two ways to save a Visual Editor page as a report template and .swf file:

Drag the hand icon in the Visual Editor to the HTML pages branch of the Repository tree Or perform the following steps:

Right-click any area of the Visual Editor. A shortcut menu will open.

Choose File> Save or File> Save As from the shortcut menu. The Save or Save As dialog box will open.

In the dialog box, type or choose the desired filename and path.

Click OK.

The tool allows publishing reports. Specifically publishing two types of reports are discussed as examples.

Static reports: Reports that always contain the exact report content generated the last time the report was created in the tool.

Dynamic reports: Reports that are newly generated each time they are accessed or refreshed (by clicking a Refresh button), and thus are always based on the most current data available in the database(s) they draw data from.

Preferably, a report template (.rep file) needs to be created. In some circumstances, the user can automatically generate a .rep file when she publishes a report. Otherwise, she needs to use the Visual Editor to create a .swf file, and a .rep file will be created automatically when the user saves this .swf file. The user could also create a rep file outside of the tool and then publish a report using that .rep file.

To publish static reports:

If it is not already done, create and save a report template or a report in the Repository tree.

Create a static HTML report file based on the report template and add it to the Site tree.

In the Repository tree, locate the node associated with the report or report template to be published, then right-click that node. A shortcut menu will open.

Report files are located in the tree's Reports branch.

Report templates are located in the tree's HTMLs branch.

Figure 11A:
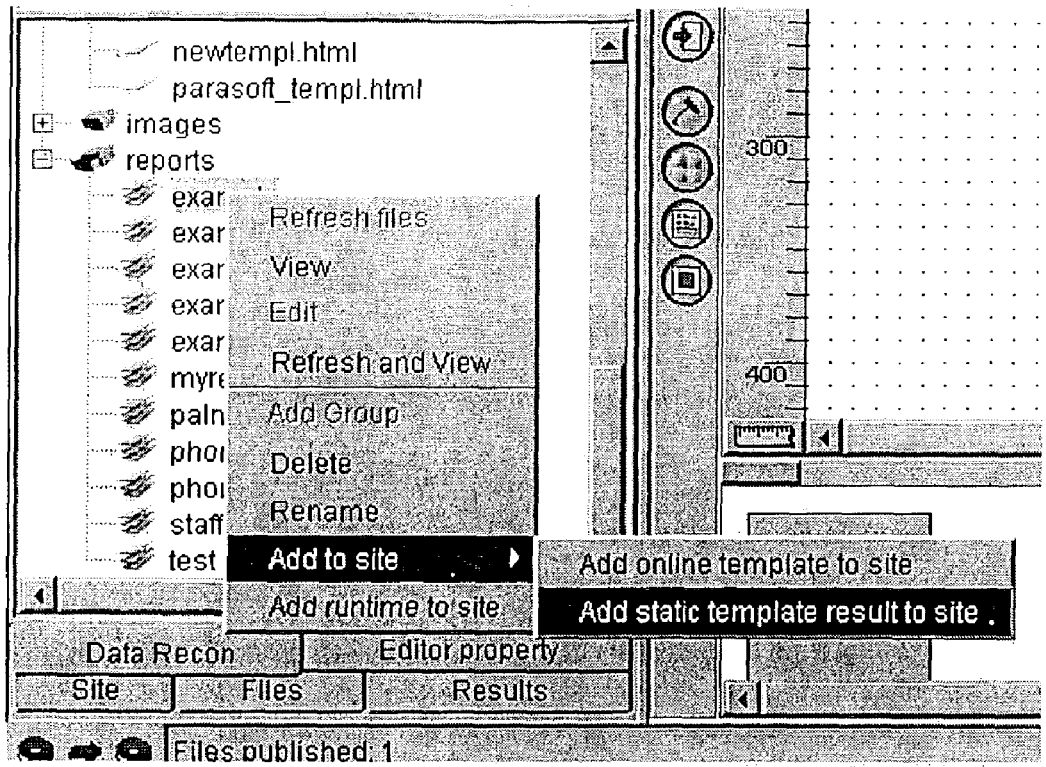

Add the static report to the Site tree by choosing Add to Site> Add Static Template Result to Site from the shortcut menu, as shown in FIG. 11A.

If the user is adding a report file, she will be asked what template she would like to base this report page on. In that case, she chooses a template in the dialog box, then clicks OK. The static report (and any associated image files stored in the Repository tree) will then be added to the Site tree.

Using the above procedure, create and add any additional static reports that to be published.

Figure 11B:
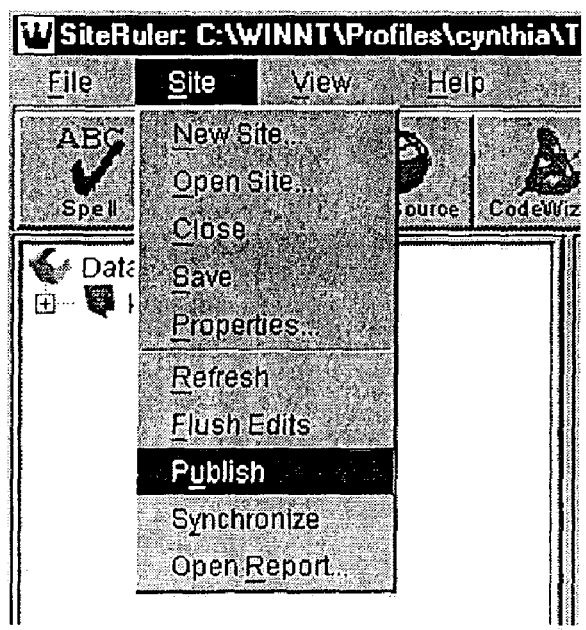

To publish the site, choose Publish from the Site menu, as shown in FIG. 11B.

For dynamic reports (reports whose contents are always based on the data source data available at the time of report access), preferably, there are three main steps involved in publishing:

1. Configure the site so that it can produce up-to-the minute reports from report templates.
2. Adding a dynamic report to the Site tree.
3. Publishing the site.

Figure 11C:
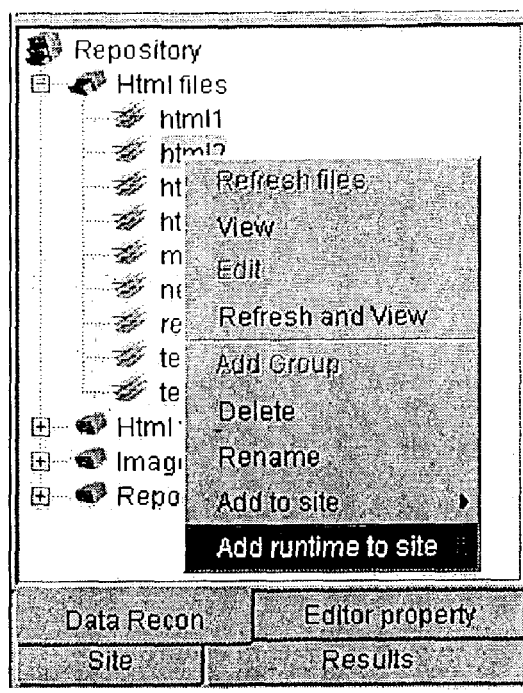
Figure 11D:
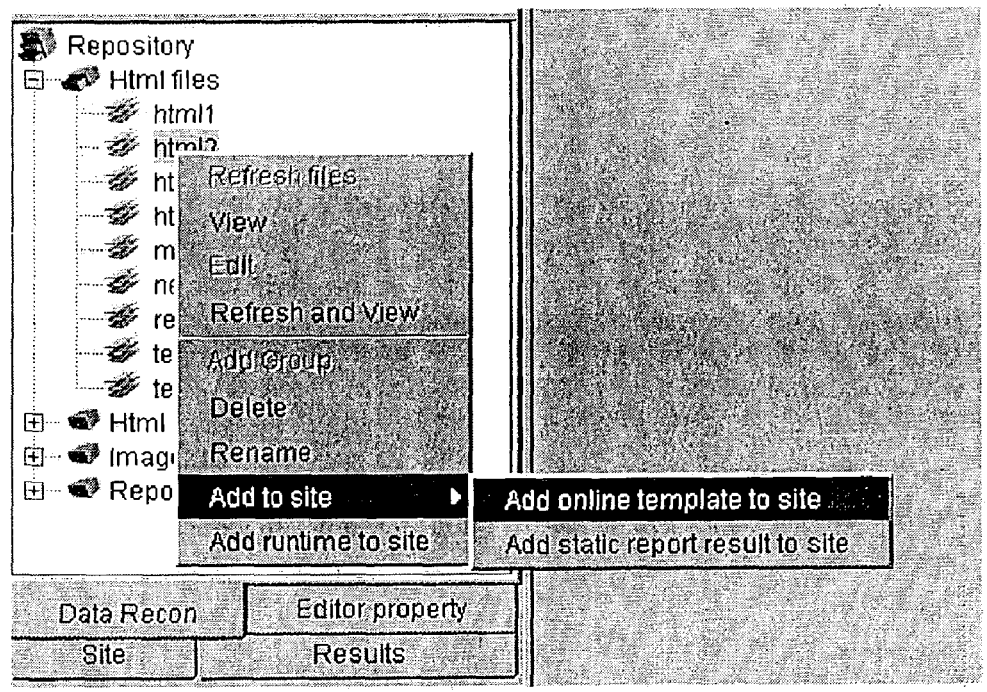

A runtime (reporter.exe) is included with the tool. The runtime is a program that can read and interpret report templates, connect to the database, perform queries, and create a final HTML page. In one embodiment the runtime is implemented utilizing a small JAVA program. In this embodiment, because the runtime is a Java program, Java needs to be installed on the machine that operates as the http server for the web or intranet site that users want to publish the dynamic report on. To install the runtime:

- Right-click any node in the Repository tree's HTML files branch, then choose Add runtime to site from the shortcut menu that opens. The dialog box of FIG. 11C will open.
- In the dialog box, click the button that corresponds to the web server's platform (UNIX or Windows).
- Follow the on-screen directions. After all dialog boxes that appear are comleted, the runtime will be added to the site tree and will be published the next time user published her site.
- If the site were to be published to multiple targets and the dynamic report files available on multiple targets, repeat the above steps for each target for the runtime to be added to.

To add a dynamic report to a site tree:

- Create and save a report template or a report in the Repository tree.
- Add a dynamic report file to the Site tree.
    - In the DataRecon tab, shown in FIG. 13D, right-click the node associated with the report template or the report to be published. A shortcut menu, shown in FUG. 11D will open.
    - Choose Add to Site> Add Online Template to Site from the shortcut menu.
        - If a report file is being added, the tool asks what template the user would like to base this report page on. Choose a template in the dialog box, then click OK. The report template (and any associated image files stored in the Repository tree) will then be added to the Site tree.

After all desired report templates are added to the Site tree, the site can be published.

When the site is published, all the files on the site (including all report templates and related image files) will be published to the specified target location (this might be a web site, or intranet site, etc). To publish the site, choose Site> Publish, as shown in FIG. 11E. Browsing to the site's URL automatically invokes the runtime, then the runtime will read and execute the report whose filename is given at the end of the URL. If a link to this report needs to be created, use the URL format above, or use a relative link. Each time this URL is accessed, the runtime will connect to the database, and execute the report based on the data available at that time. If any additional modifications are created to the report template in the Visual Editor, a new .rep file will be created when that report file is saved; this .rep file will automatically be updated the next time the site is published.

The products and internal components of the tool are customizable. Generally, to customize either a component or product of a component, the user would right-click the panel that the component or product is associated with, choose the appropriate shortcut menu item, then make the modifications in the panel that appears. For example, to determine whether or not a report include null fields, the user would right-click the Report panel, chooses Settings from the shortcut menu, then modifies the appropriate option in the Reports tab of the properties panel that opens. Moreover, to determine the number of rows that the SQL panel displays, the user would right-click the SQL panel, chooses Properties from the shortcut menu, then modifies the appropriate option in the SQL Properties panel that opened.

In one embodiment, the following categories of data source properties in the Data Source properties panel may be modified (accessible by right-clicking a data source in the Data Source tree and choosing Properties from the shortcut menu):

- Connection: Determines database connection properties.
- Drivers: Determines database driver properties.
- Relations: Determines how the tool establishes relations within data sources.
- Views: Allows adding views of a database.
- Advanced: Determines miscellaneous data source options.

When modifying data source properties is completed, the modifications can be applied by clicking Apply, or apply changes and closing the Data Source Properties panel by clicking OK. Modifications to connection properties in the can be made in the Connection tab of the Data Source Properties panel. To modify Data Source connection properties:

- In the Data Source tree, right-click the data source whose connection properties to be modified. A shortcut menu will open.
- Choose Properties from the shortcut menu. The Data Source Properties panel will open.
- Click the Connection tab in the Data Source Properties panel.
- Modify the options to be changed. Available options depend on the type of database that is being connecting to. Generally, all the databases share the following options:
    - Data Source Name: Enter the name to be assigned to this data source.
    - Driver Type: Choose the driver type from this box. If the driver type is not listed here, choose Other, then add the driver in the Drivers tab.
    - Additional options vary depending on the type of database.
- If the user is connecting to an Undefined Database, the following options are available:
    - Data Source Name: Enter or modify the name to be assigned to this data source.
    - Driver Type: Choose the driver from this box.
    - User Name: Enter user name (if required by the database)
    - Password: Enter or modify the password (if required by the database)
    - URL: Enter or modify this database's URL. If the database is stored locally, the user can enter the complete path to the database.

Drivers are what allow JDBC to open connections to databases, execute SQL commands, and process results. In one embodiment, there are four types of JDBC drivers:

1. JDBC-ODBC bridge: Translates JDBC calls into ODBC calls and passes them to an ODBC driver. Some ODBC software should reside on the client machine. Some client database code may also reside on the client machine.
2. Native-API/partly Java: Converts JDBC calls into database-specific calls. This driver, which communicates directly with the database server, also requires some binary code on the client machine.
3. Net-protocol/all Java: Communicates to a middle-tier server using a DBMS independent net protocol. A middle-tier gateway then converts the request to a vendor-specific protocol.
4. Native-protocol/all Java: Converts JDBC calls to the vendor-specific DBMS protocol, allowing client applications direct communication with the database server.

To add, update, or remove database drivers:
In the Data Source tree, right-click the data source whose driver properties to be modified. A shortcut menu will open.
Choose Data Source Properties from the shortcut menu. The Data Source Properties panel will open.
Click the Driver tab in the Data Source Properties panel. At this point, the user has four options:
1. Add a driver from the Drivers box: The Drivers box contains a list of the most popular drivers the tool supports. To add a driver that is included in this list:
Choose the driver type in the Drivers box
Make any necessary modifications to the following fields:
Label: The driver's name (any value is allowed).
Class name: The driver's class name.
Sub Protocol: The driver's sub protocol.
Description: A description of the driver.
2. Add a driver that is not included in the Drivers box. A driver even if it is not included in the Drivers box. To add an unlisted driver:
Choose Add New Driver in the Drivers box
Complete the fields, shown above.
3. Update an existing driver. To update an existing driver:
In the Driver box, choose the driver to be updated.
Click the Update Driver button.
4. Remove an existing driver. To remove an existing driver:
In the Driver box, choose the name of the driver to be removed.
Click the Remove Driver button.
The best way to determine relations is to have the tool determine relations automatically, then manually perform any required adjustments. To have the tool determine relations automatically:
In the Data Source tree, right-click the node that contains the data source's name. A shortcut menu will open.
Choose Data Source Properties from the shortcut menu. The Data Source Properties panel will open.
Click the Relations tab of the Data Source Properties panel.
Choose the appropriate option. Table I above, helps decide which option is best for a particular situation.
(Optional) Deterrine which relations to suppress.
To prevent the tool from using relations for certain fields that should not have relations, enter the relation to be suppressed in the Suppress name field, then click Add. To modify an existing suppression, select the suppression to be modified in the Suppress relations list, make the modifications, then click Modify. If an existing suppression needs to be removed, select the suppression in the Suppress relations list, then click Remove.
Click OK. The tool then re-examines the data source and automatically establish relations in the way that were selected.
To modify view properties:
Right-click the Data Source whose view properties to be modified. A shortcut menu will open.
Choose Properties from the shortcut menu. The Data Source Properties panel will open.
Click the Views tab of the Data Source Properties panel.
Modify the options to be changed. Available options include:
Add View: Tells the tool to read any existing view when it reads a data source. This is disabled by default (in order to conserve memory).
View Creation Method: Determines which of the following methods are used to create views:
Subqueries: Views are not objects stored in a database. Rather, they are stored as subqueries that are run each time the view is opened. The advantages of subqueries is that they change when the fields that comprise the view change. They work on more databases than views stored in a database, but on fewer databases than views created as a temporary table.
Views in Database: Stores views as an object in a database. The advantage of this option is that the view is modified when the fields that comprise the view change. The disadvantage is that they only run on databases that support views.
Temporary Tables: Stores views as temporary tables. Temporary tables should work on any database, but information in the temporary table is not updated when the source of the temporary table is modified.
To modify Advanced Data Source properties:
Right-click the Data Source whose advanced properties to be modied. A shortcut menu will open.
Choose Properties from the shortcut menu. A Data Source Properties panel will open.
Click the Views tab of the Data Source Properties panel.
Modify the options to change. Available options include:
Append carriage: Adds a carriage return to the end of each SQL sentence (required by some databases)
Ignore Case Key Compare: Disable this option to make the tool case insensitive when comparing keys.
Quote table and field names: Quotes names to preserve original capitalization (some databases change the case of unquoted names) or if there are spaces in file names.
Add schema name to table names: Includes schema names (names used to categorize tables; added in database) in table names.
To prevent the tool from displaying certain tables in a data source, a user can enter the names of the tables to be suppressed in the Suppressions panel. Specific tables may be specified, or use wildcards to tables that share a certain string. For example, all tables starting with the letter D can be suppressed by entering *D*. To modify an existing suppression, select the suppression to be modified in the Suppress tables list, make the modifications, then click Modify. To remove an existing suppression, select the suppression in the Suppress tables list, then click Remove.
To change a field's properties:
In the Data Source tree, right-click the field. A shortcut menu will open.
Choose Properties from the shortcut menu.
Modify the options to be changed. Available options include:
Field name: The selected field's name.
Type: The selected field's type.
Length: Determines the number of characters in a field.
Precision: Determines the number of digits displayed to the right of the decimal point.
Null Allowed: Determines whether or not Null values are allowed.
Is primary key: Indicates whether or not this field is a primary key. A field that is used to sort data can be designated a "key"; a field in which every value is unique and which is used to identify records in the current table can be designated a "primary key".

Is foreign key: Indicates whether or not this field is a primary key. A field that is used to sort data can be designated a "key"; a field in which every value is unique and which is used to identify records in a table other than the current table can be designated a "foreign key".

To modify Data Source tree properties:

Right-click any area of the Data Source tree. A shortcut menu will open.

From the shortcut menu, choose Options> Settings. The Options panel will open.

In the Options panel, modify the options to change. Available options include:

Save default data on exit: If enabled, the tool saves the current data source and configuration, then open that data source and configuration each time the tool is re-started.

Show table's schema: If enabled, the tool includes the table's schema (names used to categorize tables; added in database) in the Data Source tree.

Show tool tips: If enabled, the tool displays context-sensitive help when a cursor is positioned above program element that has an associated context-sensitive help entry.

To automatically restore the modified options each subsequent time the tool is launched, the users need to save their setting changes. If the users have set the tool to not automatically save options upon exit, they can save their setting changes by right-clicking any area of the Data Source tab, then choosing Options> Save Options from the shortcut menu. To save the setting changes, right-click any area of the Data Source tab, then choose Options> Save Options from the shortcut menu. The following categories of Report Panel properties can be changed in the Options panel (accessible by right-clicking anywhere in the Report panel and choosing Settings from the shortcut menu):

Report: Determines report settings.

General: Determines general Report panel settings.

Conditions editor: Determines Advanced Conditions Editor settings.

Expressions Editor: Determines Expressions Editor settings.

Table: Determines a report columns' default appearance.

When done modifying Report panel properties, apply changes and close the Options panel by clicking OK.

Settings that affect the default appearance of a report table can be modified in the Table tab of the Report Panel Options panel. Options that affect the report in general (rather than the actual table structure) can be modified in the Report tab of this panel. Changes made to the default report appearance will affect all report columns created after the modification. Previously existing report columns will be unaffected by these modifications. To modify report appearance properties in the Table tab:

Right-click any area of the Report panel. A shortcut menu will open.

Choose Settings from the shortcut menu. The Option panel will open.

Click the Table tab of the Options panel.

Modify the options to be changed. Available options include:

Border: Determines the thickness of the table displayed in the Table panel.

Appearance: Allows to determine the default appearance of each type of cell. To change a cell type's appearance, select the cell type from the Appearance box, then modify any of the appearance options to be changed.

Length: Number of characters (This option only applies to selected types of cells)

Precision: Number of digits displayed to the right of the decimal point. Enter 0 for values like 3, 54, 10000. Enter 3 for values like 3.336, 214.692. (This option only applies to selected types of cells)

Alignment: Alignment of numbers

The Report tab may be used to set report configuration options such as report header, title, rows, execution time, and parameter list.

Settings that affect the default appearance of a report chart can be modified in the Chart Property panel. Options that affect the report in general (rather than the actual chart structure) can be modified in the Report tab of this panel. Before modifying chart properties, the user needs to indicate that the report appear as a chart. To modify Chart properties:

Right-click any area of the Report panel. A shortcut menu will open.

Choose Chart Property from the shortcut menu. The Chart Property panel will open.

Modify the options to be changed. Available options include:

Type Tab

Horizontal Bar Chart: Prompts the tool to display the report as a horizontal bar chart.

Pie Chart: Prompts the tool to display the report as a pie chart.

Data Tab

Value: Determines what value is charted.

Label: Determines what labels are used to identify charted values.

Rows: Determines the number of records included in the chart.

Size Tab

Width: Specifies the width of the chart.

Height: Species the height of the chart.

Margins: Specifies the chart's margins.

Bar height: Specifies a height for the chart's vertical bar.

Axis Tab

Value label: Specifies the label displayed on the X-axis.

Desc. label: Specifies the label displayed on the Y-axis.

Legend

Draw legend: If checked, a chart legend will be included in the report template.

Legend position selector: Determine the position of the legend by clicking the square that corresponds to the desired legend position, as shown in FIG. 12.

Colors Tab: Allows determining the color of various chart elements. To change an element's color, click the name of the element whose color to be changed, then click the Change Color button. In the window that opens, select the desired color, then click OK.

Fonts Tab: Allows determining the font of various chart elements. To change an element's font, click the name of the element whose font you want to change, then click the Change Font button. In the window that opens, select the desired font properties, then click OK.

To see how property changes would affect the chart, click the Show Chart button.

When done modifying properties, click OK.

Modification of Conditions Editor properties and Expressions Editor properties includes similar steps to the above step. Available options include:

Autowrapping: Enables autowrapping for all text in the Conditions or Expressions Editor.

Display only tables from report: Prompts the Conditions or Expressions Editor to only display tables used in the report.

Display type offield in list: Adds the type of field to the list in the Conditions or Expression Editor.

To modify how the Report Panel's Option panel handles options:

Right-click any area of the Report panel. A shortcut menu will open.

Choose Settings from the shortcut menu. The Option panel will open.

Click the General tab of the Options panel.

Modify the options to be changed. Available options include:

Save options at exit: Saves Options panel options to an options file each time the tool is exited.

Optionsfile name: Specifies the option file's name and path.

Report properties affect how all reports are generated and formatted. Available options for report properties include:

Use DISTINCT in SELECT query: If this option is on and a report contains duplicate records, only one instance of each duplicate record is displayed.

Use relations in SELECT query: Prompts the tool to consider relations when a report is executed or other select query is performed.

Usedfields are NOTNULL: If this option is on, reports do not display records that contain a NULL value.

Append semicolon to the end of query: Adds a semicolon to the end of each select query (this use of semicolons is required by some databases).

Add AS to SELECT: Adds AS to the end of each SELECT query (this is required by some databases).

Show report header: Includes the report's header in the report.

Show report title: Includes the title in the report.

Show report execution time: Includes the report execution time in the report.

Show parameter list in report: Includes a list of parameters in the report. If a report does not use parameters, no parameters will be included.

Show location name: Includes location names in reports where locations is used to create the same type of report for similar data sources.

Suppress 00:00:00.0 in date fields: Prevents the tool from displaying 00:00:00.0 in date fields.

Number of rows to display from query: Determines the number of rows included in the report generated by the tool.

Number of rows to preview form query: Determines the number of table rows displayed in the Table panel's report preview.

Priority of query execution: Determines the priority the system gives report execution. If a low priority is selected, the report will be executed more slowly, but other tool processes will operate at optimal speeds. If a high priority is selected, reports will be generated rapidly, but other tool processes will be slow.

Changes made to the above settings will affect all reports created after the modification. Reports that were created prior to these modifications will be unaffected by these modifications.

To modify SQL Panel properties:

Right-click the unused area of the SQL panel. A shortcut menu will open.

Choose Properties from the shortcut menu. A SQL Panel Properties panel will open.

Modify the options to be changed. Available options include:

General
Priority of query execution: Determines the priority the system gives query execution.

Display
Maximum length offield: Determines the number of characters allowed in a field.
Rows per page: Determines the maximum number of rows displayed on screen at any one time.
Column sizes cached: Number of columns the tool remembers the size of and automatically sizes. In one embodiment, is the maximum number allowed.

To modify Visual Editor properties:

Right-click the canvas of the Visual Editor. A shortcut menu will open.

Choose Editor Properties from the shortcut menu. The Editor Property tab will open.

Modify the options to be changed.

To modify Visual Editor Autosave properties:

Right-click the canvas of the Visual Editor. A shortcut menu will open.

Choose File> Options from the shortcut menu. The Autosave panel will open.

Modify the options to be changed. Available options include:

Autosave enabled: Enables autosave, which saves the current Visual Editor file at regular intervals.
Interval: Specifies how often the tool automatically saves files.

It will be recognized by those skilled in the art that various modifications may be made to the illustrated and other embodiments of the invention described above, without departing from the broad inventive scope thereof. It will be understood therefore that the invention is not limited to the particular embodiments or arrangements disclosed, but is rather intended to cover any changes, adaptations or modifications which are within the scope and spirit of the invention as defined by the appended claims.

What is claimed is:

1. A system for testing interaction of a database including a schema with a software application comprising:
a rule creator module for creating patterns of relational structure for the schema to be detected in the database;
a monitor module for monitoring the interaction of the software application with the database, wherein the monitor module comprises means for profiling the interaction of the software application with the database and means for extracting SQL queries for building test suits; and
a verification module for verifying that the schema of the database adheres to the created patterns of relational structure, responsive to the monitored interaction of the software application with the database.

2. The system of claim 1, wherein the monitor module comprises:
- a proxy driver for recording and logging calls to objects in the software application; and
- a monitor console for managing the monitoring of the interaction of the software application with the database, for presenting recorded results, and for exchanging recorded data with the software application.

3. The system of claim 2, wherein the proxy driver creates a proxy connection object that wraps around an original connection object, whenever the software application requests creation of a connection to the database.

4. The system of claim 3, wherein the proxy connection object comprises one or more of the group statements and result-set.

5. The system of claim 2, wherein the monitor module comprises a graphical user interface and a message exchange server module for exchanging messages between the proxy driver and the graphical user interface.

6. The system of claim 2, wherein the proxy driver comprises a logger object module for sending monitored information to one or more of a text file, compressed file, and a graphical user interface.

7. The system of claim 1, wherein the created patterns of relational structure comprises two or more of the group of a database structure test for comparing database structure with a recorded pattern; a rule test for verifying the database against a design rule; a query load test for verifying database performance and scalability in respect to SQL statements; a statistics generator module for collecting information about database engine properties and database structure; a spell checking test for verifying correct spellings in the database; a data pollution test for verifying that no incorrect or poorly-formed data exists in the database; an on line database structure test for comparing database structures to each other and reporting any differences; and a data value test for verifying that a single value returned by a database query remains in defined limits.

8. A method for testing interaction of a database including a schema with a software application, the method comprising:
- creating patterns of relational structure for the schema to be detected in the database;
- profiling the interaction of the software application with the database; and
- verifying that the schema of the database adheres to the created patterns of relational structure, responsive to the profiling interaction of the software application with the database.

9. The method of claim 8, wherein the profiling step comprises:
- recording and logging calls to objects in the software application by a proxy driver;
- presenting recorded results; and
- exchanging recorded data with the software application.

10. The method of claim 9, further comprising creating a proxy connection object that wraps around an original connection object, whenever the software application requests creation of a connection to the database.

11. The method of claim 9, wherein the profiling step comprises exchanging messages between the proxy driver and a graphical user interface by a message exchange server module.

12. The method of claim 9, further comprising sending profiled information to one or more of a text file, compressed file, and a graphical user interface.

13. The method of claim 8, further comprising building test suites, executing the test suits, and comparing database schema with a recorded pattern.

14. The method of claim 13, wherein the step of executing the test suits comprises verifying the database against a design rule.

15. The method of claim 13, wherein the step of executing the test suits comprises verifying database performance and scalability with respect to a plurality of SQL statements.

16. The method of claim 8, wherein the step of profiling comprises a collecting information about database engine properties and database structure.

17. The method of claim 13, wherein the step of executing the test suits comprises comparing database structures to each other and reporting any differences.

18. The method of claim 8, wherein the step of profiling comprises verifying that a single value returned by a database query remains in defined limits.

19. The method of claim 8 further comprising generating reports from the database.

20. The method of claim 19 further comprising:
- specifying in a graphical user interface (GUI) information about the database;
- specifying in the GUI the data to be included in the report;
- generating a report template; and
- executing the report template to create the report based on data retrieved form the database.

21. The method of claim 20 further comprising the step of specifying in the GUI a filter for filtering out unwanted data.

22. The method of claim 20 further comprising the step of automatically determining relations between data sets.

23. The method of claim 22, wherein the step of automatically determining relations comprises inferring relations by using one or more of key, type, and name.

24. The method of claim 22 further comprising the step of specifying in the GUI information for creating an HTML template.

25. The method of claim 22 further comprising the step of specifying in the GUI where to publish the report.

* * * * *

UNITED STATES PATENT AND TRADEMARK OFFICE
CERTIFICATE OF CORRECTION

PATENT NO.        : 7,010,546 B1  
APPLICATION NO. : 10/624978  
DATED             : March 7, 2006  
INVENTOR(S)       : Kolawa et al.

Page 1 of 1

It is certified that error appears in the above-identified patent and that said Letters Patent is hereby corrected as shown below:

On the Title Page

(75) Inventors:         Delete "Marek Kucharksi, Crakow",  
                        Insert --Marek Kucharski, Krakow--

In the Claims

Column 46, line 24, Claim 16        Delete "a"

Column 46, line 40, Claim 20        Delete "form",  
                                    Insert --from--

Signed and Sealed this

Thirty-first Day of October, 2006

JON W. DUDAS  
*Director of the United States Patent and Trademark Office*